United States Patent
Tseng

(10) Patent No.: US 11,962,420 B1
(45) Date of Patent: Apr. 16, 2024

(54) METHOD AND APPARATUS OF HANDLING DISCONTINUOUS RECEPTION (DRX) TIMER FOR MULTICAST DATA RECEPTION IN A WIRELESS COMMUNICATION SYSTEM

(71) Applicant: ASUS Technology Licensing Inc., Taipei (TW)

(72) Inventor: Li-Chih Tseng, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/373,321

(22) Filed: Sep. 27, 2023

Related U.S. Application Data

(60) Provisional application No. 63/414,944, filed on Oct. 11, 2022.

(51) Int. Cl.
*H04W 72/04* (2023.01)
*H04L 1/1812* (2023.01)
*H04L 1/1829* (2023.01)
*H04L 5/00* (2006.01)
*H04W 72/30* (2023.01)
*H04W 88/08* (2009.01)

(52) U.S. Cl.
CPC .......... *H04L 1/1851* (2013.01); *H04L 1/1812* (2013.01); *H04W 72/30* (2023.01)

(58) Field of Classification Search
CPC ... H04W 28/04; H04W 72/04; H04W 72/042; H04W 88/08; H04W 72/30; H04L 5/0007; H04L 1/1851; H04L 1/1812
USPC ........................................................ 370/329
See application file for complete search history.

(56) References Cited

U.S. PATENT DOCUMENTS

| | | | | |
|---|---|---|---|---|
| 11,696,341 | B2* | 7/2023 | Wei | H04L 1/1819 370/329 |
| 11,696,360 | B2* | 7/2023 | Yu | H04W 76/14 370/329 |
| 11,765,696 | B2* | 9/2023 | Wu | H04L 5/0078 370/329 |
| 11,770,840 | B2* | 9/2023 | Park | H04L 1/188 370/329 |
| 2014/0185467 | A1* | 7/2014 | Heo | H04W 72/23 370/252 |
| 2021/0227575 | A1* | 7/2021 | Ou | H04W 76/11 |
| 2022/0039072 | A1* | 2/2022 | Babaei | H04W 72/0446 |

(Continued)

FOREIGN PATENT DOCUMENTS

TW  3 599 733 A1 *  1/2020 ............... H04L 5/00

*Primary Examiner* — Peter G Solinsky
*Assistant Examiner* — Sanjay K Dewan
(74) *Attorney, Agent, or Firm* — Cooper Legal Group LLC

(57) ABSTRACT

A method and apparatus are disclosed. In an example from the perspective of a User Equipment (UE), the UE receives and/or detects a multicast transmission of downlink data on a configured downlink multicast resource, wherein the multicast transmission is associated with a Hybrid Automatic Repeat Request (HARQ) process. The UE starts a multicast HARQ Round Trip Time (RTT) timer associated with the HARQ process. The UE determines whether to start a unicast HARQ RTT timer associated with the HARQ process based on whether the UE is configured with a Configured Scheduling Radio Network Temporary Identifier (CS-RNTI).

20 Claims, 11 Drawing Sheets

(56) References Cited

U.S. PATENT DOCUMENTS

| | | | |
|---|---|---|---|
| 2023/0097118 A1* | 3/2023 | Tseng | H04W 72/23 370/329 |
| 2023/0112798 A1* | 4/2023 | Lee | H04W 76/28 370/329 |
| 2023/0140680 A1* | 5/2023 | Zhao | H04L 1/188 370/329 |
| 2023/0224091 A1* | 7/2023 | Hu | H04W 72/1263 370/329 |
| 2023/0232493 A1* | 7/2023 | Shrivastava | H04L 5/0051 370/329 |
| 2023/0261807 A1* | 8/2023 | Bae | H04W 72/23 370/329 |
| 2023/0300941 A1* | 9/2023 | Baek | H04L 1/1854 370/329 |
| 2023/0328762 A1* | 10/2023 | Chai | H04L 1/1812 370/329 |

* cited by examiner

METHOD AND APPARATUS OF HANDLING DISCONTINUOUS RECEPTION (DRX) TIMER FOR MULTICAST DATA RECEPTION IN A WIRELESS COMMUNICATION SYSTEM

CROSS-REFERENCE TO RELATED APPLICATIONS

The present Application claims the benefit of U.S. Provisional Patent Application Ser. No. 63/414,944 filed on Oct. 11, 2022, the entire disclosure of which is incorporated herein in its entirety by reference.

FIELD

This disclosure generally relates to wireless communication networks, and more particularly, to a method and apparatus of handling Discontinuous Reception (DRX) timer for multicast data reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives and/or detects a multicast transmission of downlink data on a configured downlink multicast resource, wherein the multicast transmission is associated with a Hybrid Automatic Repeat Request (HARQ) process. The UE starts a multicast HARQ Round Trip Time (RTT) timer associated with the HARQ process. The UE determines whether to start a unicast HARQ RTT timer associated with the HARQ process based on whether the UE is configured with a Configured Scheduling Radio Network Temporary Identifier (CS-RNTI).

In an example from the perspective of a UE, the UE receives a configuration indicative of a feedback mode for multicast transmission. The UE receives and/or detects a first multicast transmission of downlink data on a configured downlink multicast resource, wherein the first multicast transmission is associated with a HARQ process. The UE transmits a negative HARQ feedback for the first multicast transmission. The UE starts a multicast HARQ RTT timer associated with the HARQ process. The UE determines whether to start a unicast HARQ RTT timer associated with the HARQ process based on the feedback mode and whether the UE is configured with a CS-RNTI.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.331 V16.0.0 (2020-03), "3GPP TSG RAN; Radio Resource Control (RRC) protocol specification (Release 16)"; 3GPP TS 36.321 V16.0.0 (2020-03), "3GPP TSG RAN; Medium Access Control (MAC) protocol specification (Release 16)"; 3GPP TS 38.321 V17.1.0 (2022-06), "3GPP TSG RAN; Medium Access Control (MAC) protocol specification (Release 17)"; 3GPP TS 38.300 V17.1.0 (2022-06), "3GPP TSG RAN; NR; NR and NG-RAN Overall Description; Stage 2 (Release 17)"; 3GPP TS 38.213 V17.2.0 (2022-06), "3GPP TSG RAN; NR; NR and NG-RAN Overall Description; Stage 2 (Release 17)"; 3GPP TS 38.331 V17.1.0 (2022-06), "3GPP TSG RAN; NR; Radio Resource Control (RRC) protocol specification (Release 17)"; R2-2209656 "Clarifications on DRX and HARQ buffer handling" Huawei, CBN, HiSilicon. The standards and documents listed above are hereby expressly incorporated by reference in their entirety.

Figure 1:
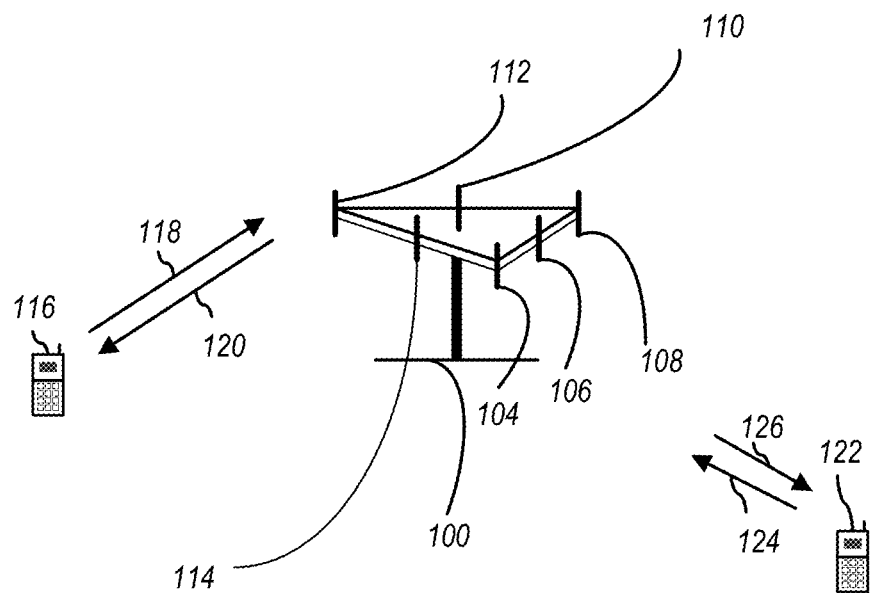
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
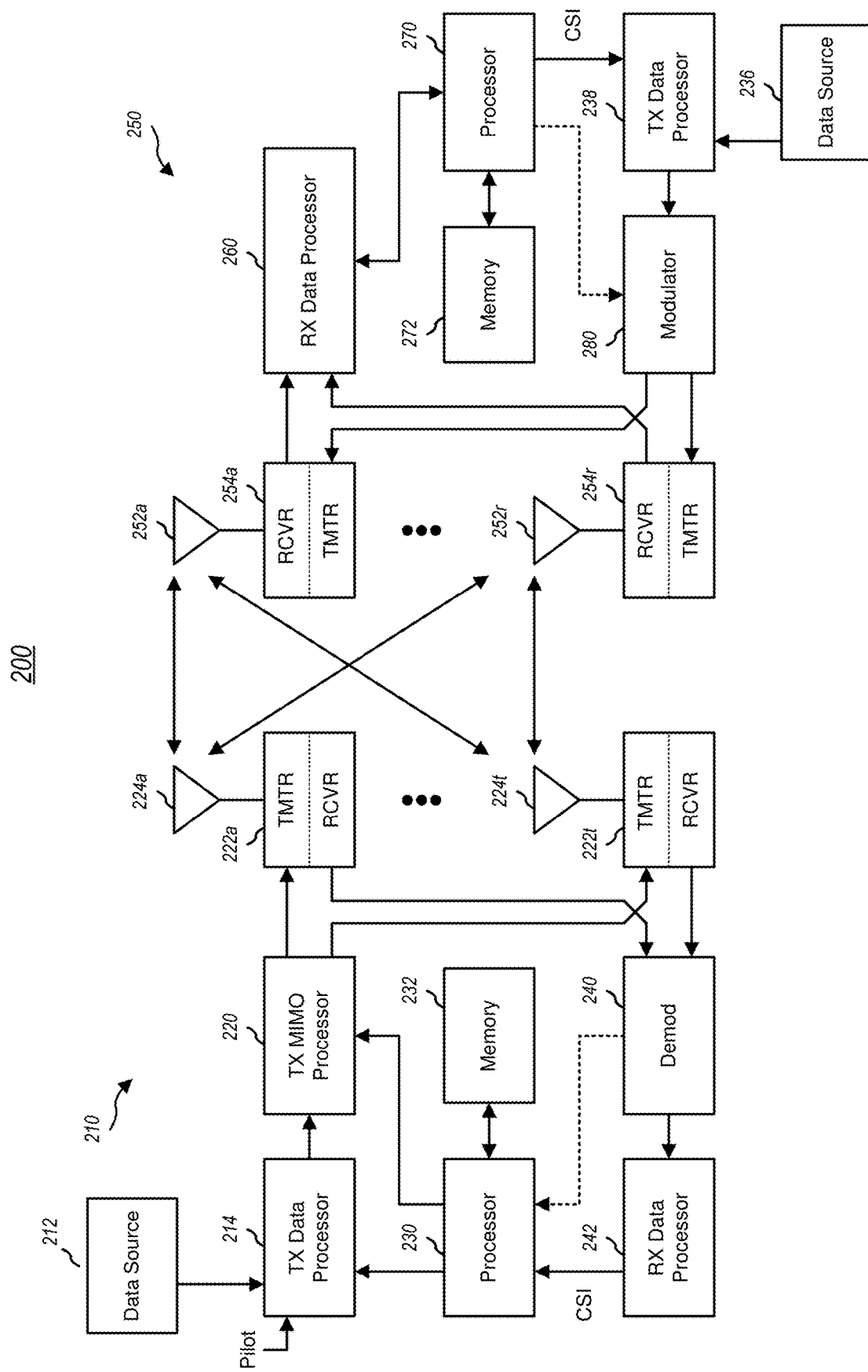
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by N R antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the N R received symbol streams from N R receivers 254 based on a particular receiver processing technique to provide N T "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
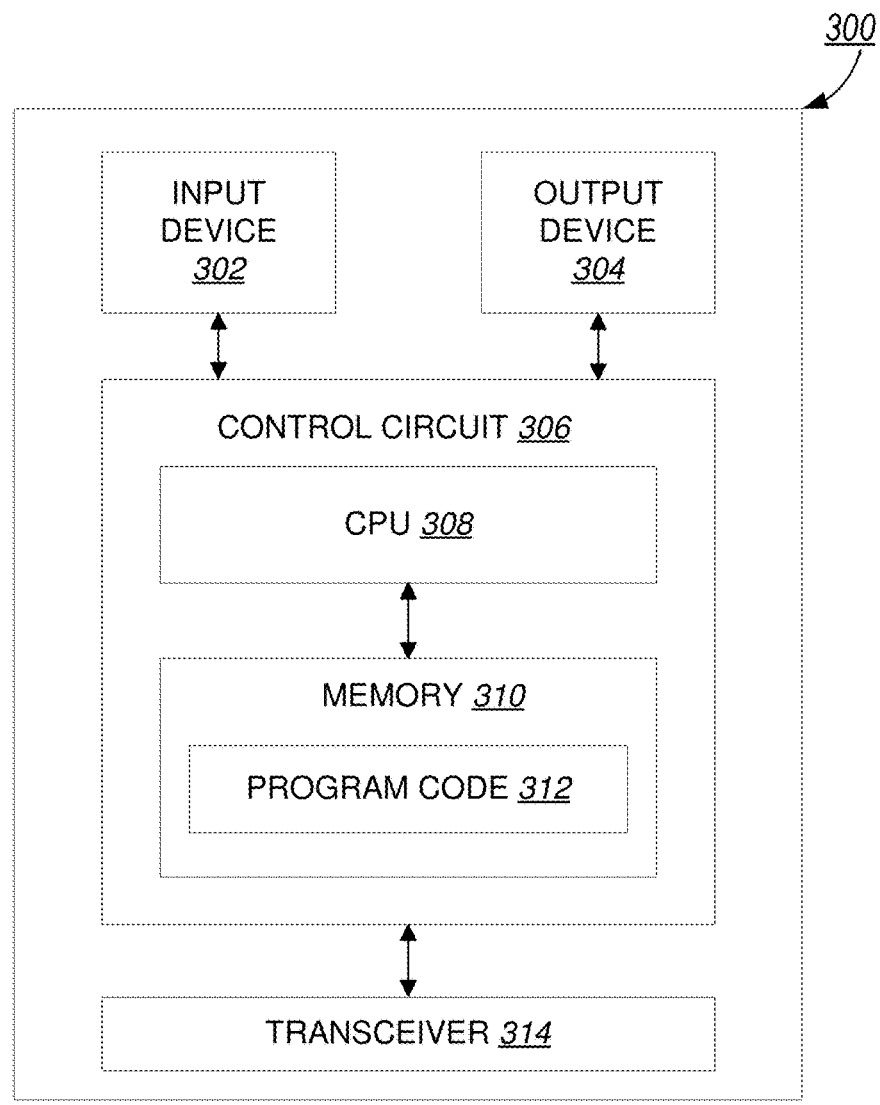
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
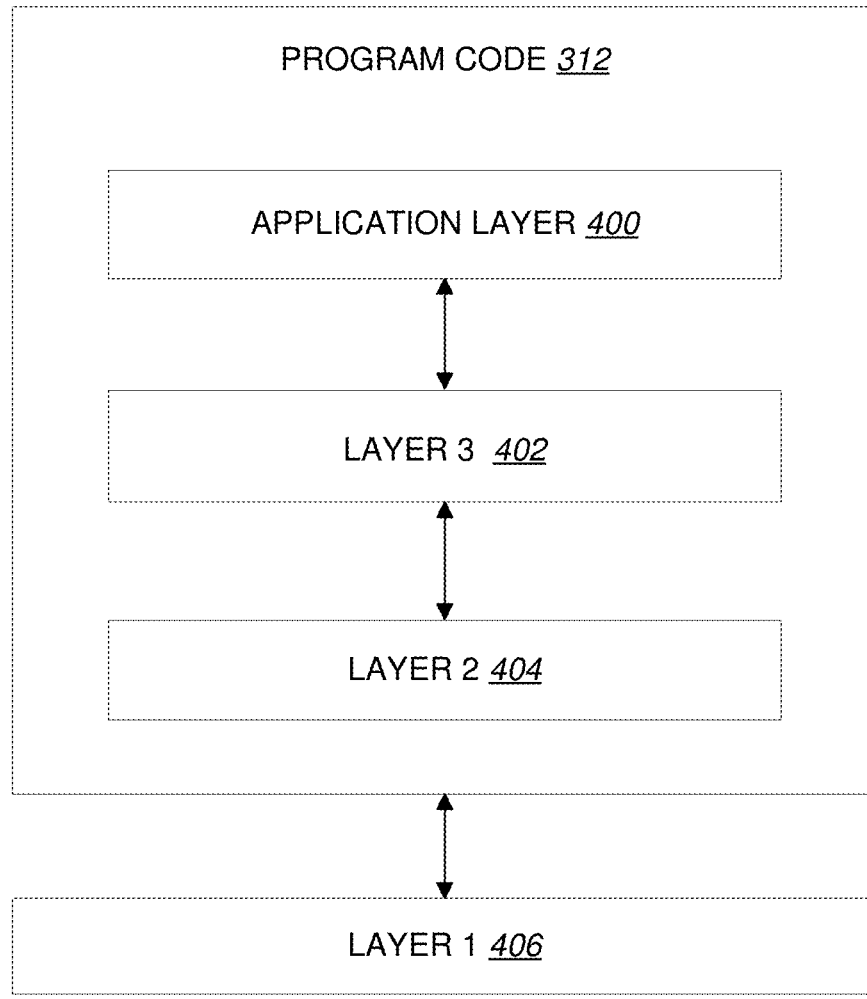
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more parts of 3GPP TS 36.331 V16.0.0 (2020-03) are quoted below:

6.3.7a SC-PTM information elements

SC-MTCH-InfoList

The IE SC-MTCH-InfoList provides the list of ongoing MBMS sessions transmitted via SC-MRB and for each MBMS session, the associated G-RNTI and scheduling information.

SC-MTCH-InfoList Information Element

```
-- ASN1START
SC-MTCH-InfoList-r13 ::=          SEQUENCE (SIZE (0..maxSC-MTCH-r13) ) OF
SC-MTCH-Info-r13
SC-MTCH-Info-r13 ::=              SEQUENCE {
    mbmsSessionInfo-r13               MBMSSessionInfo-r13,
    g-RNTI-r13                        BIT STRING (SIZE (16) ) ,
    sc-mtch-schedulingInfo-r13        SC-MTCH-SchedulingInfo-r13
OPTIONAL,   -- Need OP
    sc-mtch-neighbourCell-r13         BIT STRING (SIZE(maxNeighCell-
SCPTM-r13) ) OPTIONAL,   -- Need OP
    ...,
    [ [ p-a-r13                       ENUMERATED {
                                      dB-6, dB-4dot77, dB-3, dB-1dot 77,
                                      dB0, dB1, dB2, dB3}   OPTIONAL --
Need ON
    ] ]
}
MBMSSessionInfo-r13 ::=           SEQUENCE {
    tmgi-r13                          TMGI-r9,
    sessionId-r13                     OCTET STRING (SIZE (1) )   OPTIONAL -
- Need OR
}
SC-MTCH-SchedulingInfo-r13::=     SEQUENCE {
    onDurationTimerSCPTM-r13          ENUMERATED {
                                      psf1, psf2, psf3, psf4, psf5, psf6,
                                      psf8, psf10, psf20, psf30, psf40,
                                      psf50, psf60, psf80, psf100,
                                      psF200},
    drx-InactivityTimerSCPTM-r13      ENUMERATED {
                                      psf0, psf1, psf2, psf4, psf8,
                                      psf10, psf20, psf40,
                                      psf80, psf160, ps320,
                                      psf640, psf960,
                                      psf1280, psf1920, psf2560
    schedulingPeriodStartOffsetSCPTM-r13    CHOICE
        sf10                              INTEGER (0..9),
        sf20                              INTEGER (0..19),
        sf32                              INTEGER (0..31),
        sf40                              INTEGER (0..39),
        sf64                              INTEGER (0..63),
        sf80                              INTEGER (0..79),
        sf128                             INTEGER (0..127),
        sf160                             INTEGER (0..159),
        sf256                             INTEGER (0..255),
        sf320                             INTEGER (0..319),
        sf512                             INTEGER (0..511),
        sf640                             INTEGER (0..639),
        sf1024                            INTEGER (0..1023),
        sf2048                            INTEGER (0..2048),
        sf4096                            INTEGER (0..4096),
        sf8192                            INTEGER (0..8192)
    },
    ...
}
-- ASN1STOP
```

| SC-MTCH-InfoList field descriptions |
|---|
| drx-Inactivity TimerSCPTM<br>Timer for SC-MTCH in TS 36.321 [6]. Value in number of PDCCH sub-frames. Value psf0 corresponds to 0 PDCCH sub-frame and behaviour as specified in 7.3.2 applies, psf1 corresponds to 1 PDCCH sub-frame, psf2 corresponds to 2 PDCCH sub-frames and so on.<br>g-RNTI<br>G-RNTI used to scramble the scheduling and transmission of a SC-MTCH.<br>mbmsSessionInfo<br>Indicates the ongoing MBMS session in a SC-MTCH.<br>onDuration TimerSCPTM<br>Timer for SC-MTCH reception in TS 36.321 [6]. Value in number of PDCCH sub-frames. Value psf1 corresponds to 1 PDCCH sub-frame, psf2 corresponds to 2 PDCCH sub-frames and so on.<br>p-a<br>Parameter: $P_A''$, for the SC-MTCH per G-RNTI, see TS 36.213 [23], clause 5.2. Value dB-6 corresponds to −6 dB, dB-4dot77 corresponds to −4.77 dB etc.<br>schedulingPeriodStartOffsetSCPTM<br>SCPTM-SchedulingCycle and SCPTM-SchedulingOffset in TS 36.321 [6]. The value of SCPTM-SchedulingCycle is in number of sub-frames. Value sf10 corresponds to 10 sub-frames, sf20 corresponds to 20 sub-frames and so on. The value of SCPTM-SchedulingOffset is in number of sub-frames. The E-UTRAN does not configure a maximum value 2048 for sf2048, 4096 for sf4096 or 8192 for sf8192.<br>sc-mtch-neighbourCell<br>Indicates neighbour cells which also provide this service on SC-MTCH. The first bit is set to 1 if the service is provided on SC-MTCH in the first cell in scptmNeighbourCellList, otherwise it is set to 0. The second bit is set to 1 if the service is provided on SC-MTCH in the second cell in scptmNeighbourCellList, and so on. If this field is absent, the UE shall assume that this service is not available on SC-MTCH in any neighbour cell.<br>sc-mtch-schedulingInfo<br>DRX information for the SC-MTCH. If this field is absent, the SC-MTCH may be scheduled in any subframe. |

One or more parts of 3GPP TS 36.321 V16.0.0 (2020-03) are quoted below:

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), UL Semi-Persistent Scheduling V-RNTI (if configured), eIMTA-RNTI (if configured), SL-RNTI (if configured), SL-V-RNTI (if configured), CC-RNTI (if configured), SRS-TPC-RNTI (if configured), and AUL C-RNTI (if configured). When in RRC_CONNECTED, if DRX is configured, the MAC entity is allowed to monitor the PDCCH discontinuously using the DRX operation specified in this clause; otherwise the MAC entity monitors the PDCCH continuously. When using DRX operation, the MAC entity shall also monitor PDCCH according to requirements found in other clauses of this specification. RRC controls DRX operation by configuring the timers onDurationTimer, drx-InactivityTimer, drx-Retransmission Timer (for HARQ processes scheduled using 1 ms TTI, one per DL HARQ process except for the broadcast process), drx-RetransmissionTimerShorttTI (for HARQ processes scheduled using short TTI, one per DL HARQ process), drx-ULRetransmission Timer (for HARQ processes scheduled using 1 ms TTI, one per asynchronous UL HARQ process), drx-ULRetransmissionTimerShorttTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see clause 7.7).

When a DRX cycle is configured, the Active Time includes the time while:

5.7a Discontinuous Reception (DRX) for SC-PTM

Each G-RNTI and, for NB-IoT UEs, BL UEs or UEs in enhanced coverage, each SC-RNTI of the MAC entity may be configured by RRC with a DRX functionality that controls the UE's PDCCH monitoring activity for this G-RNTI and SC-RNTI as specified in TS 36.331 [8]. When in RRC_IDLE or RRC_CONNECTED, if DRX is configured, the MAC entity is allowed to monitor the PDCCH for this G-RNTI or SC-RNTI discontinuously using the DRX operation specified in this clause; otherwise the MAC entity monitors the PDCCH for this G-RNTI or SC-RNTI continuously. For each G-RNTI or SC-RNTI of the MAC entity, RRC controls its DRX operation by configuring the timers onDurationTimerSCPTM, drx-InactivityTimerSCPTM, the SCPTM-SchedulingCycle and the value of the SCPTM-SchedulingOffset for G-RNTI and for SC-RNTI. The DRX operation specified in this clause is performed independently for each G-RNTI and SC-RNTI and independently from the DRX operation specified in subcaluse 5.7.

When DRX is configured for a G-RNTI or for SC-RNTI, the Active Time includes the time while:
    onDurationTimerSCPTM or drx-InactivityTimerSCPTM is running When DRX is configured for a G-RNTI or for SC-RNTI as specified in TS 36.331 [8], the MAC entity shall for each subframe for this G-RNTI or SC-RNTI:
    if [(H-SFN*10240+SFN*10)+subframe number] modulo (SCPTM-SchedulingCycle)=SCPTM-SchedulingOffset:
        start onDurationTimerSCPTM.
    during the Active Time, for a PDCCH-subframe:
        monitor the PDCCH;
        if the PDCCH indicates a DL transmission:
            if the UE is a BL UE or a UE in enhanced coverage:
                start or re-start the drx-InactivityTimerSCPTM in the subframe containing the last repetition of the corresponding PDSCH reception.

if the UE is an NB-IoT UE:
stop onDurationTimerSCPTM;
stop drx-InactivityTimerSCPTM;
start the drx-InactivityTimerSCPTM in the first subframe of the next PDCCH occasion following the subframe containing the last repetition of the corresponding PDSCH reception.
else:
start or restart drx-InactivityTimerSCPTM.
NOTE: If H-SFN is not configured its value is set to 0 in the calculation of the starting subframe.

One or more parts of 3GPP TS 38.321 V17.1.0 (2022-06) are quoted below:

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and SL Semi-Persistent Scheduling V-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].
NOTE 1: Void RRC controls DRX operation by configuring the following parameters:
drx-onDurationTimer: the duration at the beginning of a DRX cycle;
drx-SlotOffset: the delay before starting the drx-onDurationTimer;
drx-InactivityTimer: the duration after the PDCCH occasion in which a PDCCH indicates a new UL or DL transmission for the MAC entity;
drx-RetransmissionTimerDL (per DL HARQ process except for the broadcast process): the maximum duration until a DL retransmission is received;
drx-RetransmissionTimerUL (per UL HARQ process): the maximum duration until a grant for UL retransmission is received;
drx-LongCycleStartOffset: the Long DRX cycle and drx-StartOffset which defines the subframe where the Long and Short DRX cycle starts;
drx-ShortCycle (optional): the Short DRX cycle;
drx-ShortCycleTimer (optional): the duration the UE shall follow the Short DRX cycle;
drx-HARQ-RTT-TimerDL (per DL HARQ process except for the broadcast process): the minimum duration before a DL assignment for HARQ retransmission is expected by the MAC entity;
drx-HARQ-RTT-TimerUL (per UL HARQ process): the minimum duration before a UL HARQ retransmission grant is expected by the MAC entity;
drx-RetransmissionTimerSL (per SL HARQ process): the maximum duration until a grant for SL retransmission is received;
drx-HARQ-RTT-TimerSL (per SL HARQ process): the minimum duration before an SL retransmission grant is expected by the MAC entity;
ps-Wakeup (optional): the configuration to start associated drx-onDurationTimer in case DCP is monitored but not detected;
ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started;
downlinkHARQ-FeedbackDisabled (optional): the configuration to enable HARQ feedback per DL HARQ process;
uplinkHARQ-Mode (optional): the configuration to set HARQmodeA or HARQmodeB per UL HARQ process.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, drx-HARQ-RTT-TimerUL, downlinkHARQ-FeedbackDisabled (optional) and uplinkHARQ-Mode (optional).

When DRX is configured, the Active Time for Serving Cells in a DRX group includes the time while:
drx-onDurationTimer or drx-InactivityTimer configured for the DRX group is running; or
drx-RetransmissionTimerDL, drx-RetransmissionTimerUL or drx-RetransmissionTimerSL is running on any Serving Cell in the DRX group; or
ra-ContentionResolutionTimer (as described in clause 5.1.5) or msgB-Response Window (as described in clause 5.1.4a) is running; or
a Scheduling Request is sent on PUCCH and is pending (as described in clause 5.4.4 or 5.22.1.5). If this Serving Cell is part of a non-terrestrial network, the Active Time is started after the Scheduling Request transmission that is performed when the SR_COUNTER is 0 for all the SR configurations with pending SR(s) plus the UE-gNB RTT; or
a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

[...]
When DRX is configured, the MAC entity shall:
1> if a MAC PDU is received in a configured downlink assignment for unicast:
2> if this Serving Cell is configured with downlinkHARQ-FeedbackDisabled:
3> if the corresponding HARQ process is configured with HARQ feedback enabled:

-continued

> 4> set HARQ-RTT-TimerDL-NTN for the corresponding HARQ process equal to drx-HARQ-
>    RTT-TimerDL plus the latest available UE-gNB RTT value;
> 4> start the HARQ-RTT-TimerDL-NTN for the corresponding HARQ process in the first
>    symbol after the end of the corresponding transmission carrying the DL HARQ feedback.
> 2> else:
> 3> start the drx-HARQ-RTT-TimerDL for the corresponding HARQ process in the first symbol
>    after the end of the corresponding transmission carrying the DL HARQ feedback.
> NOTE 1a: Void.
> NOTE 1b: Void.
> 2> stop the drx-RetransmissionTimerDL for the corresponding HARQ process;
> 2> stop the drx-RetransmissionTimerDL-PTM for the corresponding HARQ process.
> 1> if a MAC PDU is transmitted in a configured uplink grant and LBT failure indication is not
>    received from lower layers:
> [...]
> 1> if a DRX group is in Active Time:
> 2> monitor the PDCCH on the Serving Cells in this DRX group as specified in TS 38.213 [6];
> 2> if the PDCCH indicates a DL transmission; or
> 2> if the PDCCH indicates a one-shot HARQ feedback as specified in clause 9.1.4 of TS 38.213
>    [6]; or
> 2> if the PDCCH indicates a retransmission of HARQ feedback as specified in clause 9.1.5 of TS
>    38.213 [6]:
> 3> if this Serving Cell is configured with downlinkHARQ-FeedbackDisabled:
> 4> if the corresponding HARQ process is configured with HARQ feedback enabled:
> 5> set HARQ-RTT-TimerDL-NTN for the corresponding HARQ process equal to drx-
>    HARQ-RTT-TimerDL plus the latest available UE-gNB RTT value;
> 5> start the HARQ-RTT-TimerDL-NTN for the corresponding HARQ process in the first
>    symbol after the end of the corresponding transmission carrying the DL HARQ
>    feedback.
> 3> else:
> 4> start or restart the drx-HARQ-RTT-TimerDL for the corresponding HARQ process(es)
>    whose HARQ feedback is reported in the first symbol after the end of the corresponding
>    transmission carrying the DL HARQ feedback.
> NOTE 3: When HARQ feedback is postponed by PDSCH-to-HARQ_feedback timing indicating an
>    inapplicable k1 value, as specified in TS 38.213 [6], the corresponding transmission
>    opportunity to send the DL HARQ feedback is indicated in a later PDCCH requesting the
>    HARQ-ACK feedback.
> 3> stop the drx-RetransmissionTimerDL for the corresponding HARQ process(es) whose
>    HARQ feedback is reported;
> 3> stop the drx-RetransmissionTimerDL-PTM for the corresponding HARQ process;
> 3> if the PDSCH-to-HARQ_feedback timing indicate an inapplicable k1 value as specified in
>    TS 38.213 [6]:
> 4> start the drx-RetransmissionTimerDL in the first symbol after the (end of the last) PDSCH
>    transmission (within a bundle) for the corresponding HARQ process.
> [...]

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

[ . . . ]

5.7b Discontinuous Reception (DRX) for MBS Multicast

For MBS multicast, the MAC entity may be configured by RRC with a DRX functionality per G-RNTI or per G-CS-RNTI that controls the UE's PDCCH monitoring activity for the MAC entity's G-RNTI(s) and G-CS-RNTI(s) as specified in TS 38.331 [5]. When in RRC_CONNECTED, if multicast DRX is configured, the MAC entity is allowed to monitor the PDCCH for this G-RNTI or G-CS-RNTI discontinuously using the multicast DRX operation specified in this clause; otherwise the MAC entity monitors the PDCCH for this G-RNTI or G-CS-RNTI as specified in TS 38.213 [6]. The multicast DRX operation specified in this clause is performed independently for each G-RNTI or G-CS-RNTI and independently from the DRX operation specified in clauses 5.7 and 5.7a.

RRC controls multicast DRX operation per G-RNTI or per G-CS-RNTI by configuring the following parameters:
   drx-onDurationTimerPTM: the duration at the beginning of a DRX cycle;
   drx-SlotOffsetPTM: the delay before starting the drx-onDurationTimerPTM;
   drx-InactivityTimerPTM: the duration after the PDCCH occasion in which a PDCCH indicates a new DL multicast transmission for the MAC entity;
   drx-LongCycleStartOffsetPTM: the long DRX cycle drx-LongCycle-PTM and drx-StartOffset-PTM which defines the subframe where the long DRX cycle starts;
   drx-RetransmissionTimerDL-PTM (per DL HARQ process for MBS multicast): the maximum duration until a DL multicast retransmission is received;
   drx-HARQ-RTT-TimerDL-PTM (per DL HARQ process for MBS multicast): the minimum duration before a DL multicast assignment for HARQ retransmission is expected by the MAC entity.
When multicast DRX is configured for a G-RNTI or G-CS-RNTI, the Active Time includes the time while:
   drx-onDurationTimerPTM or drx-InactivityTimerPTM or drx-RetransmissionTimerDL-PTM for this G-RNTI or G-CS-RNTI is running
When multicast DRX is configured for a G-RNTI or G-CS-RNTI, the MAC entity shall for this G-RNTI or G-CS-RNTI:

```
1> if a MAC PDU is received in a configured downlink multicast assignment:
   2> if HARQ feedback is enabled:
      3> start the drx-HARQ-RTT-TimerDL-PTM for the corresponding HARQ process in the first
         symbol after the end of the corresponding transmission carrying the DL HARQ feedback;
      3> start the drx-HARQ-RTT-TimerDL for the corresponding HARQ process in the first symbol
         after the end of the corresponding transmission carrying the DL HARQ feedback.
   2> stop the drx-RetransmissionTimerDL-PTM for the corresponding HARQ process;
   2> stop the drx-RetransmissionTimerDL for the corresponding HARQ process.
1> if a drx-HARQ-RTT-TimerDL-PTM expires:
   2> if the data of the corresponding HARQ process was not successfully decoded:
      3> start the drx-RetransmissionTimerDL-PTM for the corresponding HARQ process in the first
         symbol after the expiry of drx-HARQ-RTT-TimerDL-PTM.
1> if a DRX Command MAC CE with DCI scrambled with a G-RNTI is received:
   2> stop drx-onDurationTimerPTM of the DRX for this G-RNTI;
   2> stop drx-InactivityTimerPTM of the DRX for this G-RNTI.
1> if [(SFN × 10) + subframe number] modulo (drx-LongCycle-PTM) = drx-StartOffset-PTM:
   2> start drx-onDurationTimerPTM after drx-SlotOffsetPTM from the beginning of the subframe.
1> if the MAC entity is in Active Time for this G-RNTI or G-CS-RNTI:
   2> monitor the PDCCH for this G-RNTI or G-CS-RNTI as specified in TS 38.213 [6];
   2> if the PDCCH indicates a DL multicast transmission:
      3> if HARQ feedback is enabled:
         4> start the drx-HARQ-RTT-TimerDL-PTM for the corresponding HARQ process in the first
            symbol after the end of the corresponding transmission carrying the DL HARQ feedback;
         4> start the drx-HARQ-RTT-TimerDL for the corresponding HARQ process in the first
            symbol after the end of the corresponding transmission carrying the DL HARQ feedback.
      3> stop the drx-RetransmissionTimerDL-PTM for the corresponding HARQ process;
      3> stop the drx-RetransmissionTimerDL for the corresponding HARQ process.
   2> if the PDCCH indicates a new multicast transmission for this G-RNTI or G-CS-RNTI:
      3> start or restart drx-InactivityTimerPTM in the first symbol after the end of the PDCCH
         reception.
NOTE: A PDCCH indicating activation of multicast SPS is considered to indicate a new
   transmission.
```

The MAC entity needs not to monitor the PDCCH if it is not a complete PDCCH occasion (e.g. the Active Time starts or ends in the middle of a PDCCH occasion).

Figure 5:
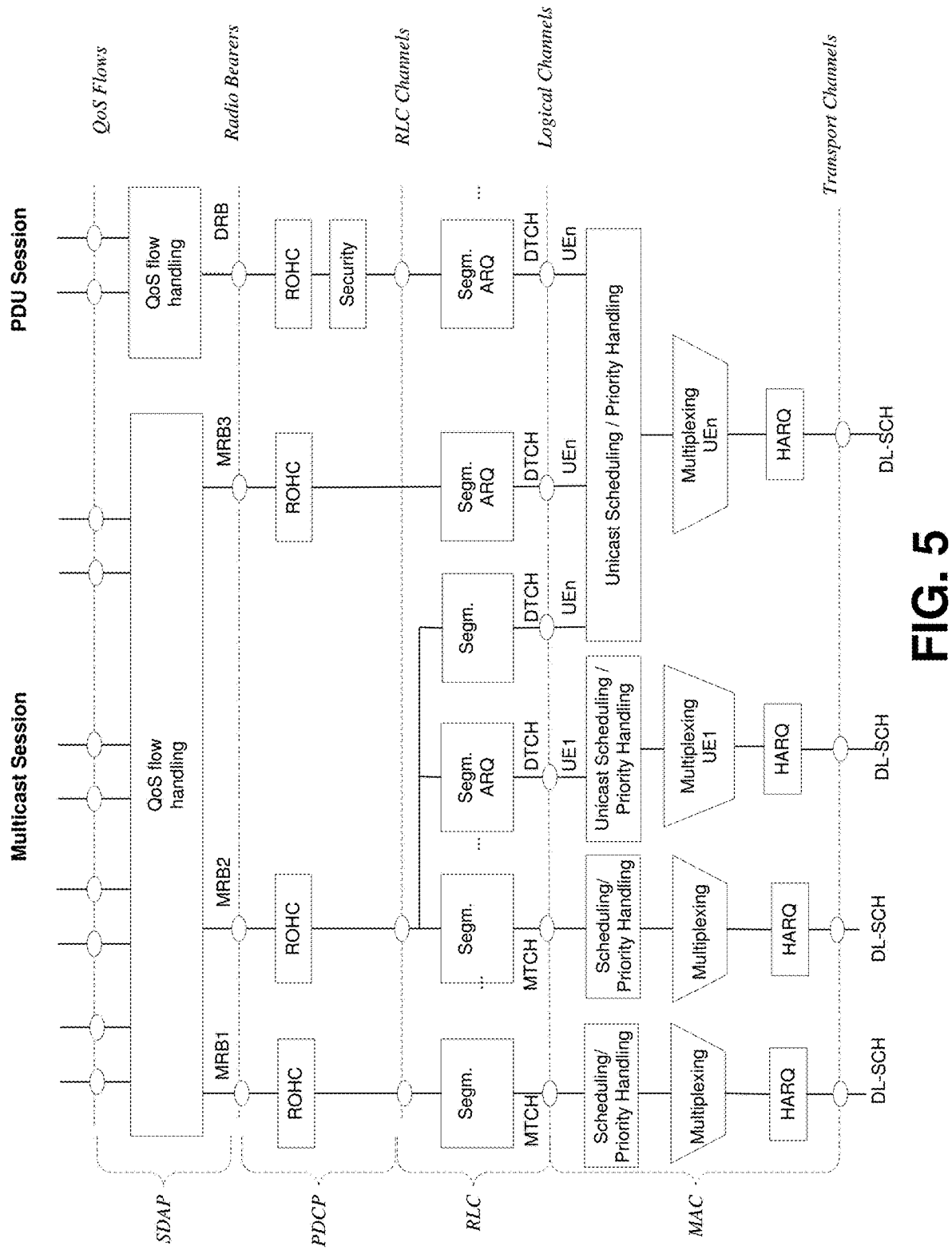
FIG. 5 is a diagram illustrating an exemplary Downlink Layer 2 architecture for a multicast session according to one exemplary embodiment.
Figure 6:
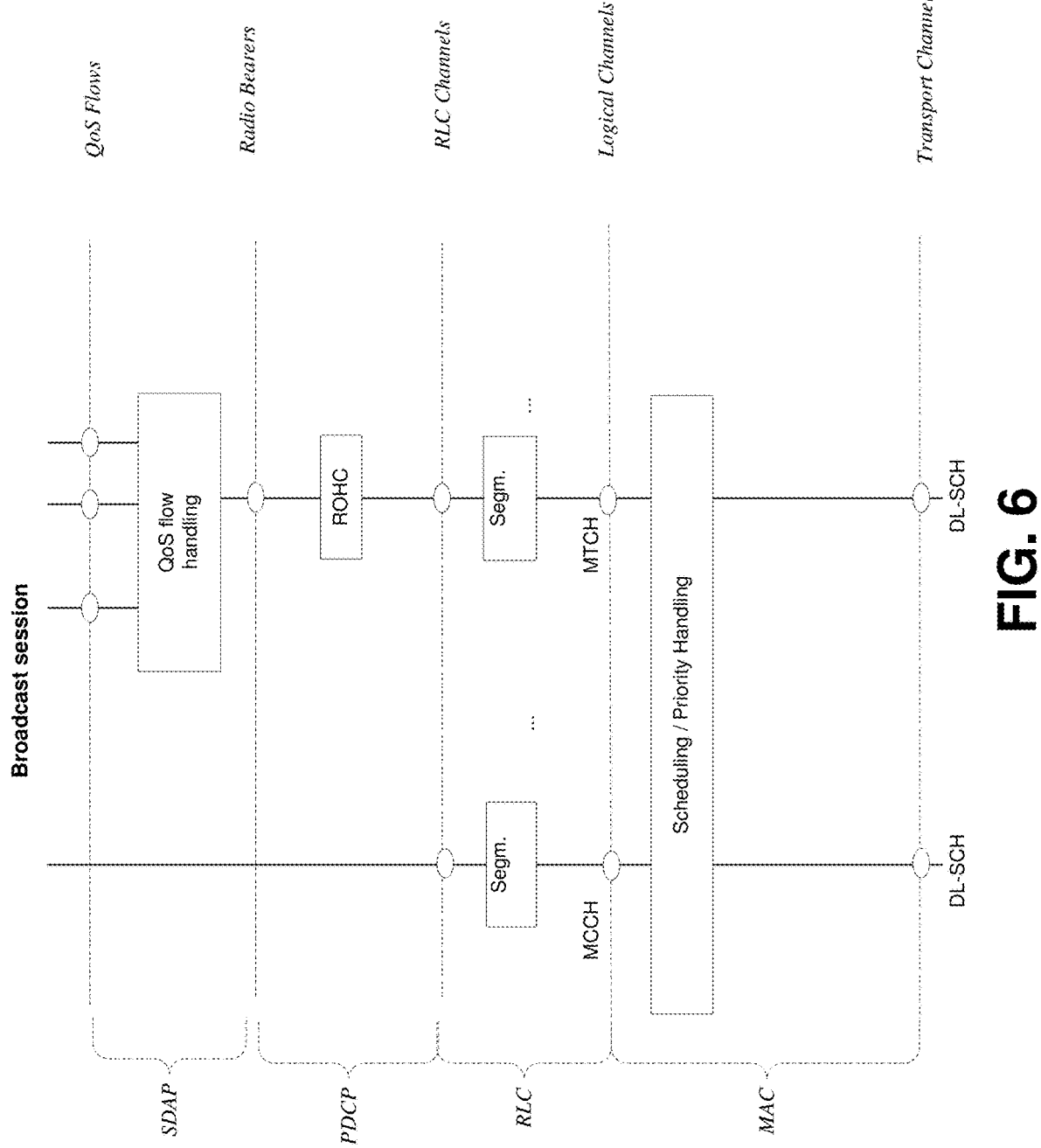
FIG. 6 is a diagram illustrating an exemplary Downlink Layer 2 architecture for a broadcast session according to one exemplary embodiment.

One or more parts of 3GPP TS 38.300 V17.1.0 (2022-06) are quoted below. Notably, FIG. 16.10.3-1 of Section 16.10.3 of 3GPP TS 38.300 V17.1.0 (2022-06), entitled "Downlink Layer 2 Architecture for Multicast Session", is reproduced herein as FIG. 5. FIG. 16.10.3-2 of Section 16.10.3 of 3GPP TS 38.300 V17.1.0 (2022-06), entitled "Downlink Layer 2 Architecture for Broadcast Session", is reproduced herein as FIG. 6.

16.10 Multicast and Broadcast Services 16.10.1 General

NR system enables resource efficient delivery of multicast/broadcast services (MBS).

For broadcast communication service, the same service and the same specific content data are provided simultaneously to all UEs in a geographical area (i.e., all UEs in the broadcast service area are authorized to receive the data). A broadcast communication service is delivered to the UEs using a broadcast session. A UE can receive a broadcast communication service in RRC_IDLE, RRC_INACTIVE and RRC_CONNECTED state.

For multicast communication service, the same service and the same specific content data are provided simultaneously to a dedicated set of UEs (i.e., not all UEs in the multicast service area are authorized to receive the data). A multicast communication service is delivered to the UEs using a multicast session. A UE can receive a multicast communication service in RRC_CONNECTED state with mechanisms such as PTP and/or PTM delivery, as defined in clause 16.10.5.4. HARQ feedback/retransmission can be applied to both PTP and PTM transmission.

16.10.2 Network Architecture

The overall NG-RAN architecture specified in clause 4 applies for NR MBS. MBS multicast can only be supported in MCG side in NE-DC and NR-DC scenarios, i.e., only for MN-terminated MCG MRB; the configuration of MBS broadcast on SCG is not supported for the UE.

The QoS model for NR MBS can be found in TS 23.247 [45].

16.10.3 Protocol Architecture

FIGS. 16.10.3-1 and 16.10.3-2 depict the downlink Layer 2 architecture for multicast session and broadcast session respectively, where MBS protocol stack comprises the same layer 2 sublayers as described in clause 6 with the following differences:

SDAP sublayer provides only the following functionalities:
  Mapping between an MBS QoS flow and an MRB;
  Transfer of user plane data.
PDCP sublayer provides only the following functionalities:
  Transfer of user plane data;
  Maintenance of PDCP SNs;
  Header compression and decompression using the ROHC protocol or EHC protocol;
  Reordering and in-order delivery;
  Duplicate discarding.
For a multicast session, gNB provides one or more of the following multicast MRB configuration(s) to the UE via dedicated RRC signalling:
  Multicast MRB with DL only RLC-UM or bidirectional RLC-UM configuration for PTP transmission;
  Multicast MRB with RLC-AM entity configuration for PTP transmission;
  Multicast MRB with DL only RLC-UM entity for PTM transmission;
  Multicast MRB with two RLC-UM entities, one DL only RLC-UM entity for PTP transmission and the other DL only RLC-UM entity for PTM transmission;
  Multicast MRB with three RLC-UM entities, one DL RLC-UM entity and one UL RLC-UM entity for PTP transmission and the other DL only RLC-UM entity for PTM transmission;

Multicast MRB with two RLC entities, one RLC-AM entity for PTP transmission and the other DL only RLC-UM entity for PTM transmission.

For a multicast session, gNB may change the MRB type using RRC signalling.

FIG. 16.10.3-1: Downlink Layer 2 Architecture for Multicast Session

For broadcast session, gNB provides the following broadcast MRB configuration to the UE using broadcast RRC signalling:
Broadcast MRB with one DL only RLC-UM entity for PTM transmission.

FIG. 16.10.3-2: Downlink Layer 2 Architecture for Broadcast Session 16.10.4 Group Scheduling
The following logical channels are used for MBS delivery:
  MTCH: A point-to-multipoint downlink channel for transmitting MBS data of either multicast session or broadcast session from the network to the UE;
  DTCH: A point-to-point channel defined in clause 6.2.2 for transmitting MBS data of a multicast session from the network to the UE;
  MCCH: A point-to-multipoint downlink channel used for transmitting MBS broadcast control information associated to one or several MTCH(s) from the network to the UE.
The following connections between logical channels and transport channels for group transmission exist:
  MCCH can be mapped to DL-SCH;
  MTCH can be mapped to DL-SCH.
The following depicts the usage of RNTI for group transmission:
  A UE can receive different services using same or different G-RNTIs/G-CS-RNTIs.
16.10.5 Multicast Handling
16.10.5.1 Session Management
There are two delivery modes as specified in TS 23.247 [45]:
  5GC Shared MBS traffic delivery;
  5GC Individual MBS traffic delivery.
As specified in TS 23.247 [45], if the gNB supports MBS, the network shall use the 5GC Shared MBS traffic delivery in which case an MBS Session Resource context for a multicast session is setup in the gNB when the first UE joins the multicast session.
For MBS shared delivery mode, shared NG-U resources are used to provide MBS user data to the gNB. The gNB initiates the Multicast Distribution Setup procedure towards the 5GC, to allocate shared NG-U resources for a multicast session. In case multiple MBS session areas are associated with the same multicast session for location dependent MBS services, multiple NG-U shared resources are established for the same multicast session per MBS Area Session ID served by the gNB.
A shared NG-U resource applies one of the following transport options:
  unicast transport;
  multicast transport.
For 5GC Shared MBS traffic delivery an MBS Session Resource comprises one or several MRBs. If minimisation of data loss is applied for a given MRB, synchronisation of allocation of PDCP COUNT values is applied by either or a combination of the following methods:

derivation of the PDCP COUNT values by means of a DL MBS QFI Sequence Number provided on NG-U. Synchronisation in terms of MBS QoS flow to MRB mapping and PDCP SN size of the corresponding MRB among gNBs are achieved by means of network implementation.

deployment of a Shared NG-U Termination at NG-RAN, shared among gNBs, which comprises a common entity for assignment of PDCP COUNT values. Synchronisation in terms of MBS QoS flow to MRB mapping and PDCP SN size of the corresponding MRB among gNBs may be achieved by means of network implementation.

If PDCP COUNT values are derived from a DL MBS QFI Sequence Number provided on NG-U and only one QoS Flow is mapped to an MRB, the gNB shall set the PDCP COUNT value of PDCP PDU to the value of the DL MBS QFI Sequence Number provided with the received packet over NG-U. If PDCP COUNT values are derived from a DL MBS QFI Sequence Number provided on NG-U and multiple QoS Flows are mapped to an MRB, the gNB may derive the PDCP COUNT value of the PDCP PDU from the sum of the DL MBS QFI Sequence Numbers of the QoS Flows mapped to this MRB.
  1. NOTE: Synchronisation of PDCP COUNT values in case user data for MBS QoS flows mapped to the same MRB arrive over NG-U at different gNBs in different order or in case of loss of data over NG-U, and related handling of minimisation of data loss is left to implementation.
[ . . . ]
16.10.5.4 Reception of MBS Multicast data
For multicast service, gNB may deliver Multicast MBS data packets using the following methods:
  PTP Transmission: gNB individually delivers separate copies of MBS data packets to each UEs independently, i.e., gNB uses UE-specific PDCCH with CRC scrambled by UE-specific RNTI (e.g., C-RNTI) to schedule UE-specific PDSCH which is scrambled with the same UE-specific RNTI.
  PTM Transmission: gNB delivers a single copy of MBS data packets to a set of UEs, e.g., gNB uses group-common PDCCH with CRC scrambled by group-common RNTI to schedule group-common PDSCH which is scrambled with the same group-common RNTI.
If a UE is configured with both PTM and PTP transmissions, a gNB dynamically decides whether to deliver multicast data by PTM leg and/or PTP leg for a given UE based on the protocol stack defined in clause 16.10.3, based on information such as MBS Session QoS requirements, number of joined UEs, UE individual feedback on reception quality, and other criteria. The same QoS requirements apply regardless of the decision.
16.10.5.5 Support of CA
UE can receive MBS multicast data either from a PCell or a single SCell at a time.
16.10.5.6 DRX
The following DRX configurations for PTM/PTP transmission are possible:
  For PTM transmission, multicast DRX is configured per G-RNTI/G-CS-RNTI which is independent of UE-specific DRX;
  For PTP transmission, UE-specific DRX is reused, i.e., UE-specific DRX is used for both unicast transmission and PTP transmission of MBS multicast. For PTM retransmission via PTP, UE monitors PDCCH scrambled by C-RNTI/CS-RNTI during UE-specific DRX's Active Time.

16.10.5.7 Physical Layer

A common frequency resource configured by SRB is defined for multicast scheduling as an 'MBS frequency region' with a number of contiguous PRBs confined within and with the same numerology as the DL BWP, but multicast scheduling may have specific characteristics (e.g., PDCCH, PDSCH and SPS configurations).

Two HARQ-ACK reporting modes are defined for MBS:

For the first HARQ-ACK reporting mode, the UE generates HARQ-ACK information with ACK value when a UE correctly decodes a transport block or detects a DCI format indicating an SPS PDSCH release; otherwise, the UE generates HARQ-ACK information with NACK value.

For the second HARQ-ACK reporting mode, the UE does not transmit a PUCCH that would include only HARQ-ACK information with ACK values.

HARQ-ACK feedback for multicast can be enabled or disabled by higher layer configuration per G-RNTI or per G-CS-RNTI and/or indication in the DCI scheduling multicast transmission.

16.10.6 Broadcast Handling [ . . . ]

One or more parts of 3GPP TS 38.213 V17.2.0 (2022-06) are quoted below:

18 Multicast Broadcast Services

This clause is applicable only for PDCCH receptions, PDSCH receptions, and PUCCH transmissions for MBS on a serving cell. DCI formats with CRC scrambled by G-RNTI or G-CS-RNTI scheduling PDSCH receptions are referred to as multicast DCI formats and the PDSCH receptions are referred to as multicast PDSCH receptions. DCI formats with CRC scrambled by MCCH-RNTI or G-RNTI for MTCH scheduling PDSCH receptions are referred to as broadcast DCI formats and the PDSCH receptions are referred to as broadcast PDSCH receptions. HARQ-ACK information associated with multicast DCI formats or multicast PDSCH receptions is referred to as multicast HARQ-ACK information.

A UE can be provided one or more G-RNTIs per serving cell for scrambling the CRC of multicast DCI formats for scheduling PDSCH receptions. The UE can be provided one or more G-CS-RNTI per serving cell for scrambling the CRC of multicast DCI formats providing activation/release for SPS PDSCH receptions.

A UE can be configured by cfr-Config-MCCH-MTCH an MBS frequency resource for PDCCH and PDSCH receptions providing MCCH and MTCH [12, TS 38.331]; otherwise, the MBS frequency resource is same as for the CORESET with index 0 that is associated with the Type0-PDCCH CSS set for PDCCH and PDSCH receptions providing MCCH and MTCH. A UE monitors PDCCH for scheduling PDSCH receptions for MCCH or MTCH as described in clause 10.1.

In clauses referring to a higher layer parameter value provided by PDCCH-ConfigCommon or PDSCH-ConfigCommon, when applicable a corresponding higher layer parameter value for MCCH/MTCH PDCCH receptions or PDSCH receptions, respectively, is provided as described in [12, TS 38.331].

A UE is not required to simultaneously receive PDSCHs for MCCH or MTCH on two serving cells. A UE is not required to simultaneously receive on a serving cell PDSCHs for MCCH and MTCH, or more than one MTCH PDSCHs, or PDSCH for MTCH and PBCH, or PDSCH for MCCH or MTCH and PDSCH scheduled by a DCI format 1_0 with CRC scrambled by SI-RNTI or by P-RNTI A UE in the RRC_CONNECTED state is not required to simultaneously receive on a serving cell PDSCHs for MCCH or MTCH and multicast PDSCH, or more than one multicast PDSCHs, or multicast PDSCH and PBCH, or PDSCH for MCCH or MTCH or multicast PDSCH and PDSCH scheduled by a DCI format 1_0 with CRC scrambled by RA-RNTI A UE can be configured, per DL BWP by cfr-Config-Multicast, an MBS frequency resource within the DL BWP for PDCCH and PDSCH receptions [4, TS 38.211]. If cfr-Config-Multicast does not include locationAndBandwidth-Multicast, the MBS frequency resource is the active DL BWP. The UE is not required to simultaneously receive PDSCHs on two serving cells. In clauses referring to a higher layer parameter value provided by PDCCH-Config or PDSCH-Config or SPS-Config for a DL BWP, when applicable a corresponding higher layer parameter value for multicast PDCCH, PDSCH, or SPS PDSCH receptions is provided as described in [12, TS 38.331].

In clauses referring to a higher layer parameter value provided by a first or second PUCCH-Config, when applicable a corresponding higher layer parameter value for PUCCH transmissions associated with multicast PDCCH or PDSCH receptions is provided as described in [12, TS 38.331]. In clauses referring to a higher layer parameter value provided by SPS-PUCCH-AN or SPS-PUCCH-AN-List, when applicable a corresponding higher layer parameter value for PUCCH transmissions associated with multicast SPS PDSCH receptions is provided as described in [12, TS 38.331]. In clauses referring to a higher layer parameter value provided by pdsch-HARQ-ACK-Codebook or pdsch-HARQ-ACK-CodebookList, when applicable a corresponding higher layer parameter value for HARQ-ACK codebooks associated with multicast HARQ-ACK information is provided as described in [12, TS 38.331].

A UE monitors PDCCH for scheduling PDSCH receptions or for activation/release of SPS PDSCH receptions for a corresponding SPS PDSCH configuration as described in clause 10.1.

A UE can be configured by harq-Feedback-Option-Multicast for a G-RNTI, or by sps-HARQ-Feedback-Option-Multicast for a G-CS-RNTI, to provide HARQ-ACK information for a transport block reception associated with the G-RNTI or with the G-CS-RNTI, respectively, according to the first HARQ-ACK reporting mode or according to the second HARQ-ACK reporting mode. The UE determines a priority for a PUCCH transmission with multicast HARQ-ACK information according to any HARQ-ACK reporting mode as described in clause 9 for a PUCCH transmission with unicast HARQ-ACK information.

For the first HARQ-ACK reporting mode, the UE generates HARQ-ACK information with ACK value when a UE correctly decodes a transport block or detects a DCI format indicating an SPS PDSCH release; otherwise, the UE generates HARQ-ACK information with NACK value, as described in clauses 9 and 9.1 through 9.3.

For the second HARQ-ACK reporting mode, the UE does not transmit a PUCCH that would include only HARQ-ACK information with ACK values. The second HARQ-ACK reporting mode is not applicable for the first SPS PDSCH reception after activation of SPS PDSCH receptions for a SPS configuration, or for DCI formats having associated HARQ-ACK information without scheduling a PDSCH reception.

For the second HARQ-ACK reporting mode, when a number of HARQ-ACK information bits is one, a UE transmits a PUCCH only when the HARQ-ACK information bit has NACK value. For a PUCCH resource associated with PUCCH format 0, the UE transmits the PUCCH as described in [4, TS 38.211] by obtaining $m_0$ as described for HARQ-ACK information in clause 9.2.3 and by setting $m_{cs}$=0. For a PUCCH resource associated with PUCCH format 1, the UE transmits the PUCCH as described in [4, TS 38.211] by setting b (0)=0.

For the second HARQ-ACK reporting mode and a UE configured with only one G-RNTI, the UE can be indicated by more ThanOneNackOnlyMode to provide the HARQ-ACK information bits in a PUCCH either according to the first HARQ-ACK reporting mode or by selecting a resource from a set of resources for the PUCCH transmission based on the values of the HARQ-ACK information bits as described in Table 18-1. The UE generates HARQ-ACK information bits for the second HARQ-ACK reporting mode according to a Type-2 HARQ-ACK codebook as described in clause 9.1.3.1.

[ . . . ]

If a UE is provided pucch-ConfigurationListMulticast1 or pucch-ConfigurationListMulticast2 for PUCCH transmissions with a priority value, the UE transmits a PUCCH with the priority value according to pucch-ConfigurationListMulticast1 or pucch-ConfigurationListMulticast2 for each G-RNTI or G-CS-RNTI that the UE provides associated HARQ-ACK information according to the first HARQ-ACK reporting mode or the second HARQ-ACK reporting mode, respectively. For HARQ-ACK information associated only with the second HARQ-ACK reporting mode, when the UE is provided more ThanOneNackOnlyMode and the UE provides the HARQ-ACK information according to the first HARQ-ACK reporting mode and in response to at least one DCI format detection, the UE determines a PUCCH resource from pucch-ConfigurationListMulticast1, if provided; otherwise, the UE determines a PUCCH resource from pucch-Config/pucch-ConfigurationList.

A PDSCH reception providing an initial transmission of a transport block is scheduled only by a multicast DCI format. For the first HARQ-ACK reporting mode, a PDSCH reception providing a retransmission of the transport block can be scheduled either by a multicast DCI format using a same G-RNTI as the G-RNTI of the initial transmission of the transport block, or by a unicast DCI format using a C-RNTI [6, TS 38.214].

An activation for SPS PDSCH receptions using a G-CS-RNTI for a corresponding SPS PDSCH configuration is provided only by a multicast DCI format as described in clause 10.2 by replacing CS-RNTI with the G-CS-RNTI. A release for SPS PDSCH receptions using a G-CS-RNTI for a corresponding SPS PDSCH configuration is provided by a multicast DCI format as described in clause 10.2 by replacing CS-RNTI with the G-CS-RNTI, or by a DCI format with CRC scrambled by CS-RNTI. For the first HARQ-ACK reporting mode and for a transport block that a UE received in a SPS PDSCH, a PDSCH reception providing a retransmission of the transport block can be scheduled either by a unicast DCI format using a CS-RNTI or by a multicast DCI format using a same G-CS-RNTI as the G-CS-RNTI of the initial transmission of the transport block [6, TS 38.214].

A UE can be configured per G-RNTI or per G-CS-RNTI, by harq-FeedbackEnablerMulticast with value set to 'enabled', to provide HARQ-ACK information for PDSCH receptions. When the UE is not provided harq-FeedbackEnablerMulticast for a G-RNTI or G-CS-RNTI, or when the UE is provided harq-FeedbackEnablerMulticast with value set to 'disabled', the UE does not provide HARQ-ACK information for respective PDSCH receptions. If a UE is provided harq-FeedbackEnablerMulticast with value set to 'dci-enabler' for a G-RNTI or a G-CS-RNTI, the UE determines whether or not to provide the HARQ-ACK information for PDSCH receptions based on an indication by the multicast DCI format associated with the G-RNTI or the G-CS-RNTI [4, TS 38.212].

If a UE would multiplex multicast HARQ-ACK information according to the second HARQ-ACK reporting mode with multicast HARQ-ACK information according to the first HARQ-ACK reporting mode, or unicast HARQ-ACK information, or CSI reports in a first PUCCH or in a PUSCH, as described in clauses 9 and 9.2.5, the UE provides the HARQ-ACK information according to the first HARQ-ACK reporting mode. For resolving an overlapping among a second PUCCH with HARQ-ACK information according to the second HARQ-ACK reporting mode and other PUCCHs or PUSCHs prior to multiplexing the HARQ-ACK information in a PUCCH or PUSCH, the UE considers that the UE would transmit the second PUCCH when all values of the HARQ-ACK information are 'ACK'.

If a UE is provided multiple G-RNTIs or G-CS-RNTIs, a configuration for a HARQ-ACK codebook type applies to all G-RNTIs or G-CS-RNTIs.

One or more parts of 3GPP TS 38.331 V17.1.0 (2022-06) are quoted below:

MAC-CellGroupCon fig

The IE MAC-CellGroupConfig is used to configure MAC parameters for a cell group, including DRX.

MAC-CellGroupConfig Information Element

```
-- ASN1START
-- TAG-MAC-CELLGROUPCONFIG-START
MAC-CellGroupConfig ::=            SEQUENCE {
    drx-Config                         SetupRelease { DRX-Config }
OPTIONAL,       -- Need M
    schedulingRequestConfig            SchedulingRequestConfig
OPTIONAL,       -- Need M
    bsr-Config                         BSR-Config
OPTIONAL,       -- Need M
    tag-Config                         TAG-Config
OPTIONAL,       -- Need M
    phr-Config                         SetupRelease { PHR-Config }
OPTIONAL,       -- Need M
    skipUplinkTxDynamic                BOOLEAN,
```

```
        ...,
        [[
        csi-Mask                                    BOOLEAN
OPTIONAL,       -- Need M
        dataInactivityTimer                         SetupRelease {
DataInactivityTime }                                            OPTIONAL   -- Cond
MCG-Only
        ]],
        [[
        usePreBSR-r16                               ENUMERATED {true}
OPTIONAL,       -- Need R
        schedulingRequestID-LBT-SCell-r16           SchedulingRequestId
OPTIONAL,       -- Need R
        lch-BasedPrioritization-r16                 ENUMERATED {enabled}
OPTIONAL,       -- Need R
        schedulingRequestID-BFR-SCell-r16           SchedulingRequestId
OPTIONAL,       -- Need R
        drx-ConfigSecondaryGroup-r16                SetupRelease { DRX-
ConfigSecondaryGroup }                                          OPTIONAL   -- Need M
        ]],
        [[
        enhancedSkipUplinkTxDynamic-r16             ENUMERATED {true}
OPTIONAL,       -- Need R
        enhancedSkipUplinkTxConfigured-r16          ENUMERATED {true}
OPTIONAL,       -- Need R
        ]],
        [[
        intraCG-Prioritization-r17                  ENUMERATED {enabled}
OPTIONAL,       -- Cond LCH-PrioWithReTxTimer
        drx-ConfigSL-r17                            SetupRelease { DRX-ConfigSL-
r17 }                   OPTIONAL,    -- Need M
        drx-ConfigExt-v1700                         SetupRelease { DRX-ConfigExt-
v1700 }                 OPTIONAL,    -- Need M
        schedulingRequestID-BFR-r17                 SchedulingRequestId
OPTIONAL,       -- Need R
        schedulingRequestID-BFR2-r17                SchedulingRequestId
OPTIONAL,       -- Need R
        schedulingRequestConfig-c1700               SchedulingRequestConfig-v1700
OPTIONAL,       -- Need M
        tar-Config-r17                              SetupRelease { TAR-Config-r17
}                                                OPTIONAL,    -- Need M
        g-RNTI-ConfigToAddModList-r17               SEQUENCE (SIZE (1..maxG-RNTI-
r17) ) OF MBS-RNTI-SpecificConfig-r17               OPTIONAL,              -- Need N
        g-RNTI-ConfigToReleaseList-r17              SEQUENCE (SIZE (1..maxG-RNTI-
r17) ) OF MBS-RNTI-SpecificConfigId-r17             OPTIONAL,              -- Need N
        g-CS-RNTI-ConfigToAddModList-r17            SEQUENCE (SIZE (1..maxG-CS-
RNTI-r17) ) OF MBS-RNTI-SpecificConfig-r17                      OPTIONAL,           -- Need N
        g-CS-RNTI-ConfigToToReleaseList-r17         SEQUENCE (SIZE (1..maxG-CS-
RNTI-r17) ) OF MBS-RNTI-SpecificConfigId-r17                    OPTIONAL,           -- Need N
        allowCSI-SRS-Tx-MulticastDRX-Active-r17                 BOOLEAN
OPTIONAL,       -- Need N
        ]]
}
DataInactivityTimer ::=             ENUMERATED {s1, s2, s3, s5, s7, s10
s15, s20, s50, s60, s80, s100, s120, s150, s180}
MBS-RNTI-SpecificConfig-r17 ::=                     SEQUENCE {
        mbs-RNTI-SpecificConfigId-r17                           MBS-RNTI-SpecificConfigId-
r17,
        groupCommon-RNTI-r17                                    CHOICE {
            g-RNTI                                                  RNTI-Value,
            g-CS-RNTI                                               RNTI-Value
        },
        drx-ConfigPTM-r17                                       SetupRelease { DRX-
ConfigPTM-r17 }                                     OPTIONAL,    -- Need M
        harq-FeedbackEnablerMulticast-r17                       ENUMERATED {dci-enabler,
enabled}                        OPTIONAL,   -- Need S
        harq-FeedbackOptionMulticast-r17                        ENUMERATED {ack-nack, nack-
only}                           OPTIONAL,   -- Cond HARQFeedback
        pdsch-AggregationFactorMulticast-r17                    ENUMERATED {n2, n4, n8}
OPTIONAL  -- Cond G-RNTI
}
MBS-RNTI-SpecificConfigId-r17 ::= INTEGER (0..maxG-RNTI-1-r17)
-- TAG-MAC-CELLGROUPCONFIG-STOP
-- ASN1STOP
```

| MAC-CellGroupConfig field descriptions |
| --- |
| allowCSI-SRS-Tx-MulticastDRX-Active |
| Used to control the CSI/SRS transmission during MBS multicast DRX ActiveTime, see TS 38.321 [3]. |
| csi-Mask |
| If set to true, the UE limits CSI reports to the on-duration period of the DRX cycle, see TS 38.321 [3]. |
| dataInactivityTimer |
| Releases the RRC connection upon data inactivity as specified in clause 5.3.8.5 and in TS 38.321 [3]. |
| Value s1 corresponds to 1 second, value s2 corresponds to 2 seconds, and so on. |
| drx-Config, drx-ConfigExt |
| Used to configure DRX as specified in TS 38.321 [3]. Network only configures drx-ConfigExt when drx-Config is configured. |
| drx-ConfigSecondaryGroup |
| Used to configure DRX related parameters for the second DRX group as specified in TS 38.321 [3]. The network does not configure secondary DRX group with DCP simultaneously nor secondary DRX group with a dormant BWP simultaneously. |
| drx-ConfigSL |
| Used to configure additional DRX parameters for the UE performing sidelink operation with resource allocation mode 1, as specified in TS 38.321 [3]. Network only configures this field if sl-ScheduledConfig is configured and drx-Config is configured |
| g-RNTI-ConfigToAddModList |
| List of G-RNTI configurations to add or modify. |
| g-RNTI-ConfigToReleaseList |
| List of G-RNTI configurations to release. |
| g-CS-RNTI-ConfigToAddModList |
| List of G-CS-RNTI configurations to add or modify. |
| g-CS-RNTI-ConfigToReleaseList |
| List of G-CS-RNTI configurations to release. |
| intraCG-Prioritization |
| Used to enable HARQ process ID selection based on LCH-priority for one CG as specified in TS 38.321 [3]. |

| Conditional Presence | Explanation |
| --- | --- |
| G-RNTI | This field is optionally present, Need S, if groupCommon-RNTI is set to g-RNTI. The field is absent when groupCommon-RNTI is set to g-CS-RNTI. |
| HARQFeedback | The field is mandatory present when harq-FeedbackEnablerMulticast is present. It is absent otherwise. |
| MCG-Only | This field is optionally present, Need M, for the MAC-CellGroupConfig of the MCG. It is absent otherwise. |
| LCH-PrioWithReTxTimer | This field is optionally present, Need R, if lch-BasedPrioritization-r16 is configured in this MAC entity and cg-RetransmissionTimer-r16 is configured for any configured grant configuration associated with this MAC entity. It is absent otherwise, Need R. |

One or more parts of R2-2209656 are quoted below:
2.2 Unnecessary start of drx-HARQ-RTT-TimerDL in case UE does not support PTP retransmission
In previous RAN2 meetings, the following agreement was reached.

RAN2#116bis e-meeting agreement:
⇒ In PTP for PTM retransmission, the UE monitors UE specific PDCCH/C-RNTI only during unicast DRX's active time. Unicast DRX's RTT timer can be started when PTP retransmission is expected.

However, in the current specification, the highlighted part is not reflected. In addition, for PTM retransmission via C-RNTI, RAN1 defines two optional UE capability: 33-2d (PTP retransmission for multicast dynamic scheduling) and 33-5-1d (PTP retransmission for SPS group-common PDCCH for multicast).
According to the current specification, even if UE does not support PTM retransmission via C-RNTI, the UE still start drx-HARQ-RTT-TimerDL for the corresponding HARQ process after receiving a PTM transmission, which will cause UE power waste.

Therefore, we propose RAN2 to clarify that UE doesn't need to start drx-HARQ-RTT-TimerDL for the corresponding HARQ process after receiving a PTM transmission if UE does not support PTM retransmission via C-RNTI.
Proposal 3: Clarify that the UE doesn't need to start drx-HARQ-RTT-TimerDL after receiving a PTM transmission if the UE does not support PTM retransmission via C-RNTI.

In some examples, a first Discontinuous Reception (DRX) (e.g., a first DRX pattern and/or configuration) is associated with a Group Radio Network Temporary Identifier (G-RNTI), which may correspond to a multicast service. A network (e.g., a gNB) may transmit (e.g., newly transmit) data (e.g., the data may comprise a transport block (TB) and/or a Medium Access Control (MAC) Protocol/Packet Data Unit (PDU)) to a plurality of UEs by multicast. The data (transmitted to the plurality of UEs) may be addressed to the G-RNTI. The plurality of UEs may be associated with the G-RNTI. In some examples, the transmission of the data addressed to the G-RNTI corresponds to a new transmission by the network (e.g., the transmission is not a retransmission of the data). In some examples, after the transmission, if the transmission was not decoded successfully by a UE (of the plurality of UEs, for example), the network may retransmit the data to the UE (e.g., the specific UE), wherein the retransmitted data may be addressed to a Cell Radio Network Temporary Identifier (C-RNTI) (of the UE, for example). In some examples, the UE may be configured with a second DRX (e.g., a second DRX pattern and/or configuration) associated with the C-RNTI, thereby requiring that there be coordination between the first DRX and the second DRX for data reception.

When a UE receives/detects data addressed to a G-RNTI for a Hybrid Automatic Repeat Request (HARQ) process from a network (e.g., a gNB) and the UE does not decode the data successfully (e.g., the UE sends HARQ feedback indicating Negative Acknowledgement (NACK)), the UE (i) may start one or more G-RNTI-related timers (e.g., a DRX retransmission timer and/or HARQ Round Trip Time (RTT) Timer) associated with the G-RNTI for the HARQ process (e.g. the one or more G-RNTI-related timers may comprise drx-RetransmissionTimerDL-PTM), and/or (ii) may start one or more C-RNTI-related timers (e.g., a DRX retransmission timer and/or HARQ RTT Timer) associated with C-RNTI for the HARQ process (e.g. the one or more C-RNTI-related timers may comprise drx-RetransmissionTimerDL). In the present disclosure, the term "receives/detects" may refer to receives and/or detects. For example, DRX retransmissions associated with the G-RNTI and the C-RNTI may be started responsive to and/or after expiry of a G-RNTI HARQ RTT Timer (of the one or more G-RNTI-related timers, for example) and a C-RNTI HARQ RTT Timer (of the one or more C-RNTI-related timers, for example), respectively (e.g. drx-HARQ-RTT-TimerDL-PTM and drx-HARQ-RTT-TimerDL). In an example, DRX retransmissions associated with the G-RNTI (and/or a G-RNTI timer) may be started responsive to and/or after expiry of the G-RNTI HARQ RTT Timer (e.g. the G-RNTI HARQ RTT Timer may be drx-HARQ-RTT-TimerDL-PTM). In an example, DRX retransmissions associated with the C-RNTI (and/or a C-RNTI timer) may be started responsive to and/or after expiry of the C-RNTI HARQ RTT Timer (e.g. the C-RNTI HARQ RTT Timer may be drx-HARQ-RTT-TimerDL). In some examples, UE may determine to start a C-RNTI retransmission timer (e.g., a timer, such as DRX retransmission timer, of the one or more C-RNTI-related timers) based on first information. In some examples, the first information may comprise information (e.g., an indication) of a configuration, such as a Physical Downlink Control Channel (PDCCH) configuration and/or a Radio Resource Control (RRC) configuration. The first information (e.g., the configuration, such as the PDCCH configuration and/or the RRC configuration) may indicate that C-RNTI transmission (e.g., retransmission) may occur for the multicast transmission (addressed to G-RNTI, for example) for the same content (e.g., the same data, the same TB, the same MAC PDU, etc.). For example, the first information may indicate that C-RNTI transmission may be performed to retransmit content (e.g., data, TB, MAC PDU, etc.) transmitted via a (prior) multicast transmission (addressed to G-RNTI, for example). The C-RNTI transmission may be a unicast transmission. In some examples, the aforementioned timers (e.g., at least one of the one or more G-RNTI-related timers, the one or more C-RNTI-related timers, a DRX retransmission timer, a HARQ RTT Timer, the G-RNTI HARQ RTT Timer, the C-RNTI HARQ RTT Timer, drx-HARQ-RTT-TimerDL-PTM, drx-HARQ-RTT-TimerDL, etc.) may have different lengths. Embodiments are contemplated in which two or more of the aforementioned timers share the same length.

In some examples, when a UE receives/detects data (e.g. retransmission) addressed to C-RNTI for a HARQ process from gNB/network and UE does not decode the data successfully (e.g., the UE may send HARQ feedback indicating NACK), the UE (i) may start a DRX retransmission timer and/or HARQ RTT Timer associated with C-RNTI for the HARQ process (e.g. drx-RetransmissionTimerDL), and (ii) may not start DRX retransmission timer and/or HARQ RTT Timer associated with G-RNTI for the HARQ process (e.g. drx-RetransmissionTimerDL-PTM). In some examples, the UE may start the G-RNTI retransmission timer responsive to (e.g., upon) expiry of HARQ RTT Timer associated with G-RNTI for the HARQ process.

In some examples, if gNB receives a NACK (e.g., any NACK) for a multicast data from UE side (e.g., from a UE), gNB may retransmit the data through multicast (e.g., G-RNTI) and unicast (e.g., C-RNTI) for different UEs at (around) the same time and/or within a time period. When UE receives/detects a retransmission addressed to G-RNTI and/or C-RNTI for the HARQ process (associated with the multicast data, for example), the UE may stop both G-RNTI and C-RNTI retransmission timers. UE may not continue to monitor PDCCH for C-RNTI and/or G-RNTI retransmission (e.g., the UE may cease monitoring PDCCH for C-RNTI and/or G-RNTI retransmission after stopping both the G-RNTI and C-RNTI retransmission timers).

In some examples, assuming that UE is capable (and/or enabled and/or allowed and/or configured and/or indicated and/or instructed) to send HARQ feedback for a multicast (e.g., G-RNTI) data/Physical Downlink Shared Channel (PDSCH)/TB, two options may be available for the UE. In the present disclosure, the term "data/PDSCH/TB" may refer to data, a PDSCH and/or a TB. A first option of the two options may be sending Acknowledgement (ACK) (e.g., explicit ACK) on Physical Uplink Control Channel (PUCCH) if decoding (e.g., G-RNTI data/PDSCH decoding) of the multicast data/PDSCH/TB is successful; otherwise sending NACK. For example, according to the first option, the UE may send NACK if the UE does not successfully decode the multicast data/PDSCH/TB (e.g., in response to failing decoding the multicast data/PDSCH/TB). A second option of the two options may be (i) not sending ACK (even) if decoding (e.g., G-RNTI data/PDSCH decoding) of the multicast data/PDSCH/TB is successful, and (ii) sending NACK (on a common/shared resource on PUCCH, for example) if the decoding of the multicast data/PDSCH/TB is failed. In some examples, the UE may determine which option of the two options (for multicast data/PDSCH/TB, for example) based on a RRC configuration (e.g. harq-FeedbackEnablerMulticast and/or harq-FeedbackOptionMulticast), Downlink Control Information (DCI) and/or PDCCH. The first option may correspond to ack-nack mode and/or the second option may correspond to nack-only mode.

If a UE uses nack-only mode (for multicast data/PDSCH/TB, for example) (e.g. harq-FeedbackOptionMulticast=nack-only), the UE may (still) start unicast HARQ RTT Timer and/or unicast DRX retransmission timer when the UE receives/detects a multicast (e.g., G-RNTI) data/PDSCH/TB and the UE fails decoding the multicast (e.g., G-RNTI) data/PDSCH/TB. Considering that NACK may be sent from more than one UE, the UE starting the unicast HARQ RTT Timer and/or the unicast DRX retransmission timer based on failing to successfully decode the multicast (e.g., G-RNTI) data/PDSCH/TB may result in UE power waste since gNB/network may not schedule any corresponding unicast (e.g., C-RNTI) retransmission for a specific UE.

Figure 7:
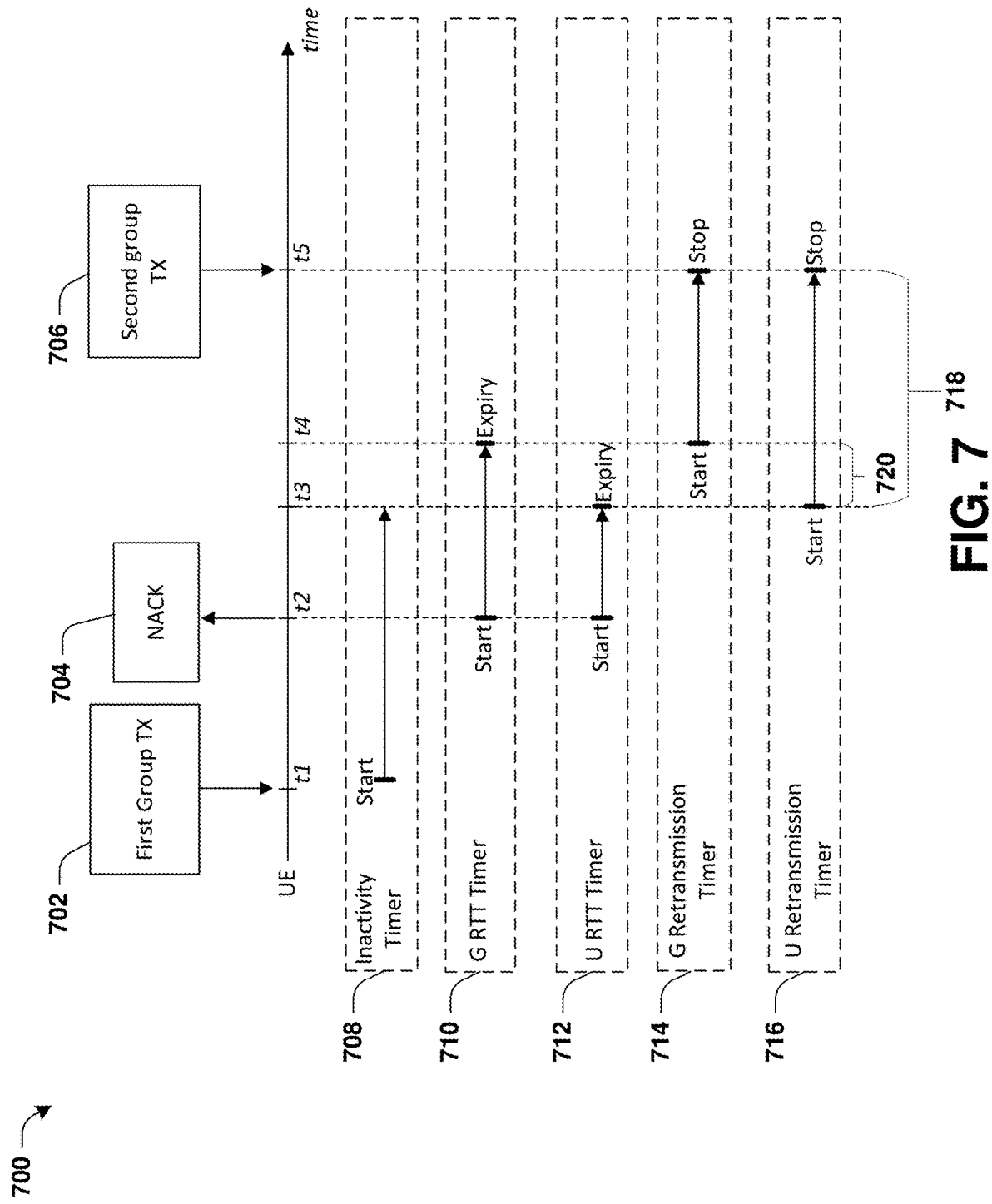
FIG. 7 is a diagram illustrating an exemplary scenario associated with a UE receiving a transmission and/or operating one or more timers according to one exemplary embodiment.

FIG. 7 illustrates a scenario 700 associated with a UE receiving a first multicast transmission 702. In some examples, the UE receives/detects the first multicast transmission 702 using a configured downlink (DL) multicast resource (e.g., a pre-configured downlink multicast resource. In some examples, the configured downlink multicast resource comprises a configured (e.g., pre-configured) downlink multicast assignment. In some examples, the UE receives/detects the first multicast transmission 702 from a network (e.g., a gNB) at time t1. In some examples, the first multicast transmission 702 is addressed to a G-RNTI of a group of UEs (e.g., a plurality of UEs) comprising the UE. In some examples, the first multicast transmission 702 is associated with a first HARQ process. In some examples, the first multicast transmission 702 is a transmission of data/PDSCH/TB for the first HARQ process. In some examples, the UE starts an inactivity timer 708 at or after the time t1. In some examples, the UE starts the inactivity timer 708 in response to receiving the first multicast transmission 702. In some examples, the UE transmits HARQ feedback 704 indicating NACK at time t2. In some examples, the UE transmits (on a common/shared resource, for example) the HARQ feedback 704 indicating NACK based on the UE not successfully decoding the first multicast transmission 702 (e.g., decoding the first multicast transmission 702 is failed). In some examples, the HARQ feedback 704 indicating NACK is associated with the first HARQ process. The UE starts (both) a multicast RTT timer 710 (e.g., a multicast HARQ RTT timer) and a unicast RTT timer 712 (e.g., a unicast HARQ RTT timer). In some examples, the multicast RTT timer 710 comprises drx-HARQ-RTT-TimerDL-PTM. In some examples, the unicast RTT timer 712 comprises drx-HARQ-RTT-TimerDL. In some examples, the UE starts (both) the multicast RTT timer 710 and the unicast RTT timer 712 in response to transmitting the HARQ feedback 704 indicating NACK (and/or in response to failing to decode the first multicast transmission 702). In some examples, the multicast RTT timer 710 and/or the unicast RTT timer 712 are associated with the first HARQ process. In some examples, at time t3, the UE starts a unicast retransmission timer 716 in response to expiry of the unicast RTT timer 712. In some examples, the UE is configured to monitor (e.g., actively monitor) a control channel (e.g., PDCCH) for a unicast (e.g., C-RNTI) retransmission (e.g., a unicast retransmission of the first multicast transmission 702) while the unicast retransmission timer 716 is running. In some examples, at time t4, the UE starts a multicast retransmission timer 714 in response to expiry of the multicast RTT timer 710. In some examples, the UE is configured to monitor (e.g., actively monitor) a control channel (e.g., PDCCH) for a multicast (e.g., G-RNTI) retransmission (e.g., a multicast retransmission of the first multicast transmission 702) while the multicast retransmission timer 714 is running. In some examples, the multicast retransmission timer 714 and/or the unicast retransmission timer 716 are associated with the first HARQ process. In some examples, the multicast retransmission timer 714 comprises drx-RetransmissionTimerDL-PTM. In some examples, the unicast retransmission timer 716 comprises drx-RetransmissionTimerDL.

In some examples, the UE receives/detects a second multicast transmission 706 (e.g., a G-RNTI transmission) at time t5. In some examples, the second multicast transmission 706 is transmitted by the network (e.g., the gNB). In some examples, the second multicast transmission 706 is associated with the first HARQ process. In some examples, the second multicast transmission 706 is a transmission (e.g., retransmission) of the data/PDSCH/TB (of the first multicast transmission 702) for the first HARQ process. In some examples, the second multicast transmission 706 comprises a retransmission (e.g., a G-RNTI retransmission) of the first multicast transmission 702. In some examples, the network (e.g., the gNB) transmits the second multicast transmission 706 in response to the HARQ feedback 704 indicating NACK (and/or in response to other HARQ feedback from one or more other UEs of the group of UEs). In some examples, the UE stops the multicast retransmission timer 714 and/or the unicast retransmission timer 716 in response to receiving the second multicast transmission 706.

Thus, the UE may perform control channel monitoring (e.g., active monitoring of a control channel, such as PDCCH) during a first period of time 718 (while the unicast retransmission timer 716 and/or the multicast retransmission timer 714 are running, for example). The first period of time 718 comprises a second period of time 720 during which the multicast retransmission timer 714 is not running (e.g., merely the unicast retransmission timer 716 is running during the second period of time 720). In some examples, the control channel monitoring performed by the UE during the second period of time 720 is unproductive (and/or unnecessary and/or supplementary) since the network (e.g., the gNB) is not configured to retransmit the first multicast transmission 702 via a unicast (e.g., C-RNTI) retransmission. Thus, monitoring (e.g., actively monitoring) the control channel (e.g., PDCCH) for a unicast (e.g., C-RNTI) transmission (e.g., unicast retransmission of the first multicast transmission 702) during the second period of time 720 may be a waste of power and/or resources of the UE.

Figure 8:
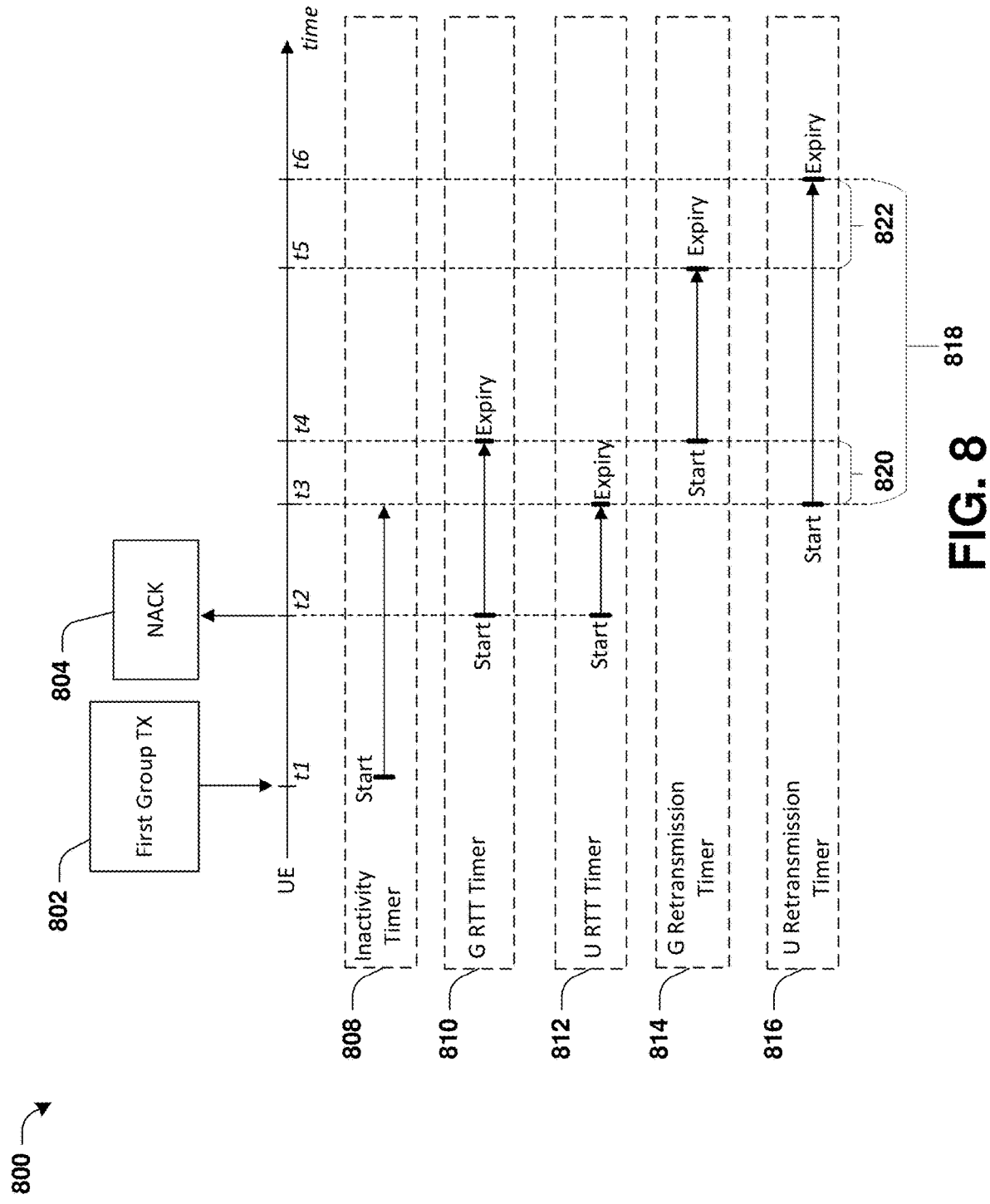
FIG. 8 is a diagram illustrating an exemplary scenario associated with a UE receiving a transmission and/or operating one or more timers according to one exemplary embodiment.

FIG. 8 illustrates a scenario 800 associated with a UE receiving a first multicast transmission 802. In some examples, the UE receives/detects the first multicast transmission 802 using a configured downlink multicast resource (e.g., a pre-configured downlink multicast resource. In some examples, the configured downlink multicast resource comprises a configured (e.g., pre-configured) downlink multicast assignment. In some examples, the UE receives/detects the first multicast transmission 802 from a network (e.g., a gNB) at time t1. In some examples, the first multicast transmission 802 is addressed to a G-RNTI of a group of UEs (e.g., a plurality of UEs) comprising the UE. In some examples, the first multicast transmission 802 is associated with a first HARQ process. In some examples, the first multicast transmission 802 is a transmission of data/PDSCH/TB for the first HARQ process. In some examples, the UE starts an inactivity timer 808 at or after the time t1. In some examples, the UE starts the inactivity timer 808 in response to receiving the first multicast transmission 802. In some examples, the UE transmits HARQ feedback 804 indicating NACK at time t2. In some examples, the UE transmits (on a common/shared resource, for example) the HARQ feedback 804 indicating NACK based on the UE not successfully decoding the first multicast transmission 802 (e.g., decoding the first multicast transmission 802 is failed). In some examples, the HARQ feedback 804 indicating NACK is associated with the first HARQ process. The UE starts (both) a multicast RTT timer 810 (e.g., a multicast HARQ RTT timer) and a unicast RTT timer 812 (e.g., a unicast HARQ RTT timer). In some examples, the multicast RTT timer 810 comprises drx-HARQ-RTT-TimerDL-PTM. In some examples, the unicast RTT timer 812 comprises drx-HARQ-RTT-TimerDL. In some examples, the UE starts (both) the multicast RTT timer 810 and the unicast RTT timer 812 in response to transmitting the HARQ feedback 804 indicating NACK (and/or in response to failing to decode the first multicast transmission 802). In some examples, the multicast RTT timer 810 and/or the unicast RTT timer 812 are associated with the first HARQ process. In some examples, at time t3, the UE starts a unicast retransmission timer 816 in response to expiry of the unicast RTT timer 812. In some examples, the UE is configured to monitor (e.g., actively monitor) a control channel (e.g., PDCCH) for a unicast (e.g., C-RNTI) retransmission (e.g., a unicast retransmission of the first multicast transmission 802) while the unicast retransmission timer 816 is running. In some examples, at time t4, the UE starts a multicast retransmission timer 814 in response to expiry of the multicast RTT timer 810. In some examples, the UE is configured to monitor (e.g., actively monitor) a control channel (e.g., PDCCH) for a multicast (e.g., G-RNTI) retransmission (e.g., a multicast retransmission of the first multicast transmission 802) while the multicast retransmission timer 814 is running. In some examples, the multicast retransmission timer 814 and/or the unicast retransmission timer 816 are associated with the first HARQ process. In some examples, the multicast retransmission timer 814 expires at time t5. In some examples, the unicast retransmission timer 816 expires at time t6 after time t5. In some examples, the multicast retransmission timer 814 comprises drx-RetransmissionTimerDL-PTM. In some examples, the unicast retransmission timer 816 comprises drx-RetransmissionTimerDL.

Thus, the UE may perform control channel monitoring (e.g., active monitoring of a control channel, such as PDCCH) during a first period of time 818 (while the unicast retransmission timer 816 and/or the multicast retransmission timer 814 are running, for example). The first period of time 818 comprises a second period of time 820 and a third period of time 822 during which the multicast retransmission timer 814 is not running (e.g., merely the unicast retransmission timer 816 is running during the second period of time 820 and the third period of time 822). In some examples, the control channel monitoring performed by the UE during the second period of time 820 and the third period of time 822 is unproductive (and/or unnecessary and/or supplementary) since the network (e.g., the gNB) is not configured to retransmit the first multicast transmission 802 via a unicast (e.g., C-RNTI) retransmission. Thus, monitoring (e.g., actively monitoring) the control channel (e.g., PDCCH) for a unicast (e.g., C-RNTI) transmission (e.g., unicast retransmission of the first multicast transmission 802) during the second period of time 820 and the third period of time 822 may be a waste of power and/or resources of the UE.

In accordance with some embodiments, the present disclosure provides techniques that when implemented provide for increased efficiency of the UE and/or avoid power wastage and/or resource wastage of the UE.

Figure 9:
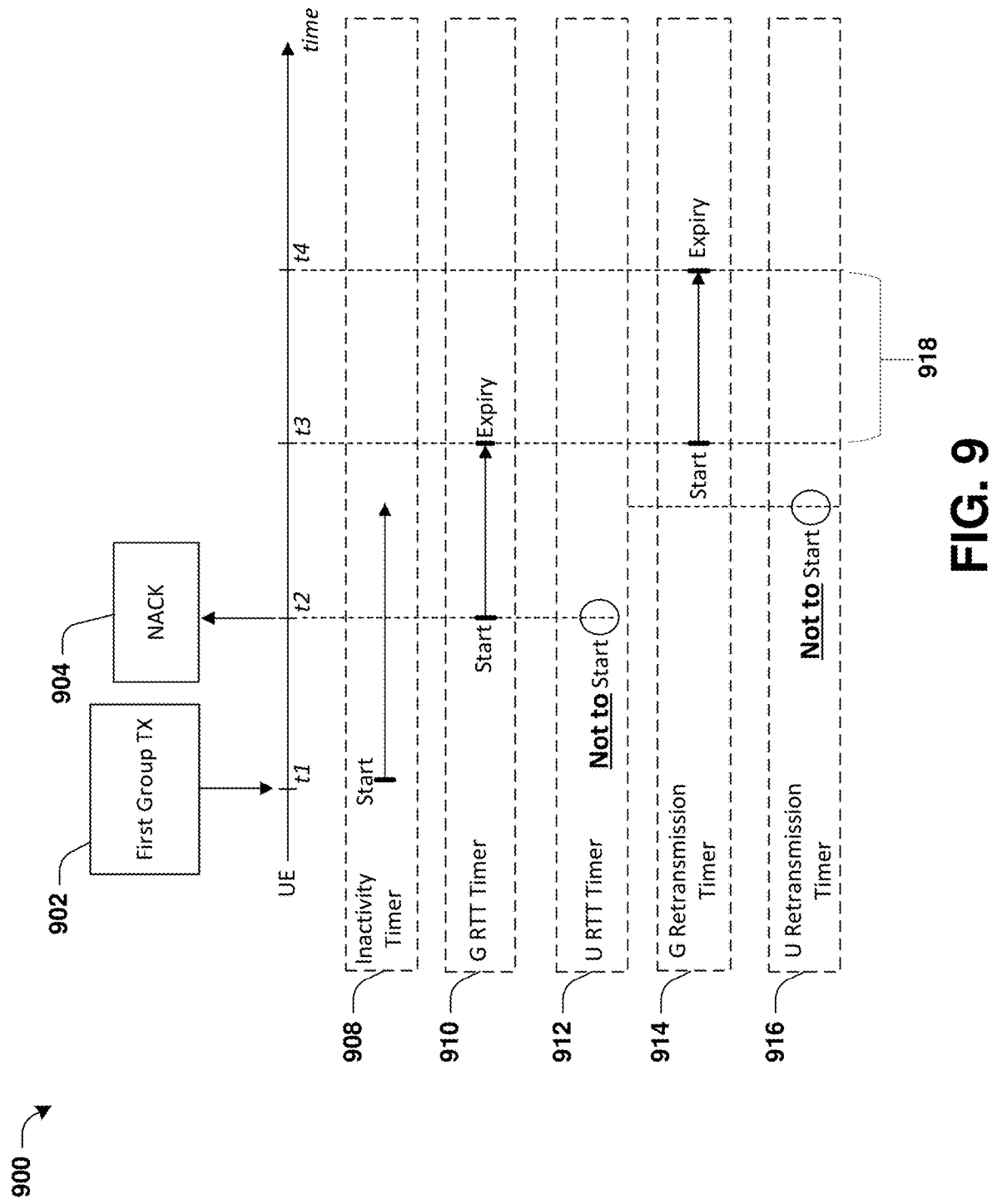
FIG. 9 is a diagram illustrating an exemplary scenario associated with a UE receiving a transmission and/or operating one or more timers according to one exemplary embodiment.

FIG. 9 illustrates a scenario 900 associated with a UE receiving a first multicast transmission 902. In some examples, the UE receives/detects the first multicast transmission 902 from a network (e.g., a gNB) at time t1. In some examples, the UE receives/detects the first multicast transmission 902 using a configured downlink multicast resource (e.g., a pre-configured downlink multicast resource. In some examples, the configured downlink multicast resource comprises a configured (e.g., pre-configured) downlink multicast assignment. In some examples, the first multicast transmission 902 is addressed to a G-RNTI of a group of UEs (e.g., a plurality of UEs) comprising the UE. In some examples, the first multicast transmission 902 is associated with a first HARQ process. In some examples, the first multicast transmission 902 is a transmission of data/PDSCH/TB for the first HARQ process. In some examples, the UE starts an inactivity timer 908 at or after the time t1. In some examples, the UE starts the inactivity timer 908 in response to receiving the first multicast transmission 902. In some examples, the UE transmits HARQ feedback 904 indicating NACK at time t2. In some examples, the UE transmits the HARQ feedback 904 indicating NACK based on the UE not successfully decoding the first multicast transmission 902 (e.g., decoding the first multicast transmission 902 is failed). In some examples, the HARQ feedback 904 indicating NACK is associated with the first HARQ process.

In some examples, the UE determines whether to start a multicast RTT timer 910 (e.g., a multicast HARQ RTT timer) and/or a unicast RTT timer 912 (e.g., a unicast HARQ RTT timer). In some examples, the multicast RTT timer 910 comprises drx-HARQ-RTT-TimerDL-PTM. In some examples, the unicast RTT timer 912 comprises drx-HARQ-RTT-TimerDL. In some examples, the multicast RTT timer 910 and/or the unicast RTT timer 912 are associated with the first HARQ process. In some examples, the UE determines whether to start the multicast RTT timer 910 and/or the unicast RTT timer 912 in response to transmitting the HARQ feedback 904 indicating NACK (and/or in response to failing to decode the first multicast transmission 902). In some examples, the UE determines to start the multicast RTT timer 910. In some examples, the UE determines to start the multicast RTT timer 910 in response to transmitting the HARQ feedback 904 indicating NACK (and/or in response to failing to decode the first multicast transmission 902). In some examples, the UE starts the multicast RTT timer 910 in response to determining to start the multicast RTT timer 910. In some examples, the UE starts the multicast RTT timer 910 at time t2.

In some examples, the UE determines whether to start the unicast RTT timer 912 based on a feedback mode (e.g., HARQ feedback mode). In some examples, the feedback mode is used and/or indicated for the first multicast transmission 902. Alternatively and/or additionally, the feedback mode may be associated with the first HARQ process (e.g., the feedback mode may be used and/or indicated for the first HARQ process). In some examples, the UE determines the feedback mode based on an indication of the feedback mode, which may be received from the network (e.g., the gNB). In some examples, the UE receives a configuration (from the network, for example) and determines the feedback mode based on the configuration (e.g., the configuration is indicative of the feedback mode). In some examples, the UE determines to start the unicast RTT timer 912 based on the feedback mode being ack-nack mode. In some examples, the UE determines not to start the unicast RTT timer 912 based on the feedback mode being nack-only mode.

In some examples, the UE determines whether to start the unicast RTT timer 912 based on a first configuration (e.g., a configurable configuration in RRC layer). In some examples, the UE determines to start the unicast RTT timer 912 based on the first configuration (e.g., RRC configuration) indicating a first value. In some examples, the UE determines not to start the unicast RTT timer 912 based on the first configuration indicating a second value.

In some examples, the UE determines whether to start the unicast RTT timer 912 based on a type of resource used to send the HARQ feedback 904 indicating NACK (e.g., the UE determines whether to start the unicast RTT timer 912 based on whether the resource is common, shared, and/or dedicated). In some examples, the UE determines to start the unicast RTT timer 912 based on the HARQ feedback 904 (e.g., NACK) being transmitted via a dedicated and/or specific PUCCH resource (e.g., a PUCCH resource that is dedicated to being used by the UE and/or is not usable by other UEs). In some examples, the UE determines not to start the unicast RTT timer 912 based on the HARQ feedback 904 (e.g., NACK) being transmitted via a common and/or shared PUCCH resource (e.g., a PUCCH resource for more than one UE that is not dedicated to being used by the UE).

In some examples, the UE determines whether to start the unicast RTT timer 912 based on whether the UE is configured with a Configured Scheduling Radio Network Temporary Identifier (CS-RNTI). In some examples, the CS-RNTI is used for detecting a transmission (e.g., a retransmission) of the data/PDSCH/TB (of the first multicast transmission 702) associated with the first HARQ process. In some examples, the UE determines to start the unicast RTT timer 912 based on the UE being configured with the CS-RNTI (e.g., the UE may be configured to use the CS-RNTI for detecting a retransmission associated with the first HARQ process). In some examples, the UE determines not to start the unicast RTT timer 912 based on the UE not being configured with the CS-RNTI (e.g., the UE may not be configured to use the CS-RNTI for detecting a retransmission associated with the first HARQ process).

In some examples, the UE determines not to start the unicast RTT timer 912 (at time t2, for example) based on (i) the feedback mode being nack-only mode, (ii) the first configuration (e.g., the RRC configuration) indicating the second value, (iii) the HARQ feedback 904 (e.g., NACK) being transmitted via the common and/or shared PUCCH resource, and/or (iv) the UE not being configured with the CS-RNTI (e.g., the UE may not be configured to use the CS-RNTI for detecting a retransmission associated with the first HARQ process).

In some examples, the UE determines to start the unicast RTT timer 912 (at time t2, for example) based on (i) the feedback mode being ack-nack mode, (ii) the first configuration (e.g., the RRC configuration) indicating the first value, (iii) the HARQ feedback 904 (e.g., NACK) being transmitted via the dedicated and/or specific PUCCH resource, and/or (iv) the UE being configured with the CS-RNTI (e.g., the UE may be configured to use the CS-RNTI for detecting a retransmission associated with the first HARQ process).

In some examples, the UE determines to start the multicast RTT timer 910 and not to start the unicast RTT timer 912 based on (i) the feedback mode being nack-only mode, (ii) the first configuration (e.g., the RRC configuration) indicating the second value, (iii) the HARQ feedback 904 (e.g., NACK) being transmitted via the common and/or shared PUCCH resource, and/or (iv) the UE not being configured with the CS-RNTI (e.g., the UE may not be configured to use the CS-RNTI for detecting a retransmission associated with the first HARQ process). For example, the UE may start the multicast RTT timer 910 at time t2 without starting the unicast RTT timer 912 (such as shown in the scenario 900 of FIG. 9) based on (i) the feedback mode being nack-only mode, (ii) the first configuration (e.g., the RRC configuration) indicating the second value, (iii) the HARQ feedback 904 (e.g., NACK) being transmitted via the common and/or shared PUCCH resource, and/or (iv) the UE not being configured with the CS-RNTI (e.g., the UE may not be configured to use the CS-RNTI for detecting a retransmission associated with the first HARQ process).

In some examples, the UE determines to start (both) the multicast RTT timer 910 and the unicast RTT timer 912 based on (i) the feedback mode being ack-nack mode, (ii) the first configuration (e.g., the RRC configuration) indicating the first value, (iii) the HARQ feedback 904 (e.g., NACK) being transmitted via the dedicated and/or specific PUCCH resource, and/or (iv) the UE being configured with the CS-RNTI (e.g., the UE may be configured to use the CS-RNTI for detecting a retransmission associated with the first HARQ process). For example (not shown in FIG. 9), the UE may start the multicast RTT timer 910 and the unicast RTT timer 912 at time t2 based on (i) the feedback mode being ack-nack mode, (ii) the first configuration (e.g., the RRC configuration) indicating the first value, (iii) the HARQ feedback 904 (e.g., NACK) being transmitted via the dedicated and/or specific PUCCH resource, and/or (iv) the UE being configured with the CS-RNTI (e.g., the UE may be configured to use the CS-RNTI for detecting a retransmission associated with the first HARQ process).

In some examples, the UE is configured to monitor (e.g., actively monitor) a control channel (e.g., PDCCH) for a unicast (e.g., C-RNTI) retransmission while a unicast retransmission timer 916 is running. In some examples, the unicast retransmission timer 916 and/or a multicast retransmission timer 914 are associated with the first HARQ process. In some examples, the multicast retransmission timer 914 comprises drx-RetransmissionTimerDL-PTM. In some examples, the unicast retransmission timer 916 comprises drx-RetransmissionTimerDL.

In some examples, the UE does not start the unicast retransmission timer 916 (since the unicast RTT timer 912 was not started and/or did not expire, for example). In some examples, at time t3, the UE starts the multicast retransmission timer 914 in response to expiry of the multicast RTT timer 910. In some examples, the UE is configured to monitor (e.g., actively monitor) a control channel (e.g., PDCCH) for a multicast (e.g., G-RNTI) retransmission (e.g., a multicast retransmission of the first multicast transmission 902) while the multicast retransmission timer 914 is running. In some examples, the multicast retransmission timer 914 expires at time t4.

Embodiments are contemplated in which the UE (i) starts the unicast RTT timer 912 at time t2 (along with the multicast RTT timer 910, for example), and (ii) determines whether to start the unicast retransmission timer 916 (in response to expiry of the unicast RTT timer 912, for example) based on the feedback mode, the first configuration, the type of resource used to send the HARQ feedback 904, whether the UE is configured with the CS-RNTI, and/or other information. In some examples, the UE determines not to start the unicast retransmission timer 916 (in response to expiry of the unicast RTT timer 912, for example) based on (i) the feedback mode being nack-only mode, (ii) the first configuration (e.g., the RRC configuration) indicating the second value, (iii) the HARQ feedback 904 (e.g., NACK) being transmitted via the common and/or shared PUCCH resource, and/or (iv) the UE not being configured with the CS-RNTI (e.g., the UE may not be configured to use the CS-RNTI for detecting a retransmission associated with the first HARQ process). In some examples, the UE does not start the unicast retransmission timer 916 in response to determining not to start the unicast retransmission timer 916. In some examples, the UE determines to start the unicast retransmission timer 916 (in response to expiry of the unicast RTT timer 912, for example) based on (i) the feedback mode being ack-nack mode, (ii) the first configuration (e.g., the RRC configuration) indicating the first value, (iii) the HARQ feedback 904 (e.g., NACK) being transmitted via the dedicated and/or specific PUCCH resource, and/or (iv) the UE being configured with the CS-RNTI (e.g., the UE may be configured to use the CS-RNTI for detecting a retransmission associated with the first HARQ process). In some examples, the UE starts the unicast retransmission timer 916 in response to determining to start the unicast retransmission timer 916 (e.g., the unicast retransmission timer 916 is started in response to expiry of the unicast RTT timer 912).

It may be appreciated that, in accordance with some embodiments herein, the UE may not waste power and/or resources monitoring a control channel (e.g., PDCCH) for a unicast retransmission of a multicast transmission (e.g., the first multicast transmission 902) when the network (e.g., the gNB) is not scheduled to provide a unicast retransmission (e.g., any unicast retransmission) of the multicast transmission. Thus, the present disclosure provides for improved efficiency in comparison with some systems in which the UE may start (both) the unicast RTT timer 912 and the unicast retransmission timer 916 without considering the feedback mode, the first configuration, the type of resource used to send the HARQ feedback 904, and/or whether the UE is configured with the CS-RNTI.

In some examples, one, some and/or all of the aforementioned instances of the term "C-RNTI" may be replaced by the term "CS-RNTI", such as in embodiments where a multicast transmission (e.g., the first multicast transmission 702, the first multicast transmission 802, the first multicast transmission 902) is detected/received (and/or decoded) based on a configured (e.g., pre-configured) multicast resource, such as a configured (e.g., pre-configured) downlink multicast assignment.

In an example, in FIG. 7, UE may keep monitoring (e.g., active monitoring) a control channel (e.g., PDCCH) for a unicast (e.g., C-RNTI) retransmission within the first period of time 718 (including the second period of time 720) until detection of G-RNTI (re)transmission associated with the PDSCH/data/TB for the same HARQ process at time t5. Similar example in FIG. 8, if no retransmission is detected by UE or scheduled by the network (e.g. according to network scheduling strategy, such as gNB scheduling strategy) and the length of unicast DRX retransmission timer is longer than groupcast/multicast DRX retransmission timer, UE may need to additionally/unnecessarily monitor control channel (e.g., PDCCH) within the third period of time 822. For solving these problems, UE may (i) determine to start unicast HARQ RTT Timer (e.g., C-RNTI HARQ RTT Timer) and/or unicast DRX Retransmission Timer (e.g., C-RNTI DRX Retransmission Timer) if ack-nack mode is used (and/or indicated) for the multicast data/PDSCH/TB and/or (ii) determine not to start the unicast HARQ RTT Timer and/or not to start the unicast DRX Retransmission Timer if nack-only mode is used (and/or indicated) for the multicast data/PDSCH/TB (e.g., G-RNTI data/PDSCH/TB). UE may determine whether to start C-RNTI HARQ RTT Timer and/or DRX Retransmission Timer based on HARQ feedback mode (e.g. ack-nack mode or nack-only mode) used (and/or indicated and/or configured) for the multicast data/PDSCH/TB for the first HARQ process and/or based on a configurable configuration in RRC layer (and/or based on other information). In an example, in FIG. 9, UE may determine not to start unicast HARQ RTT Timer at time t2 and/or not to start unicast DRX Retransmission Timer (responsive to, such as upon, unicast HARQ RTT Timer expiry, for example). In some examples, UE may (attempt to, for example) receive and/or decode the multicast data/PDSCH/TB based on a configured (e.g., pre-configured) multicast resource (e.g. a configured downlink multicast assignment). In some examples, the aforementioned C-RNTI may be replaced by CS-RNTI if the multicast data/PDSCH/TB is decoded and/or received based on a pre-configured multicast resource.

In some examples, UE may (i) determine to start unicast HARQ RTT Timer (e.g., C-RNTI HARQ RTT Timer) and/or unicast DRX Retransmission Timer (e.g., C-RNTI DRX Retransmission Timer) if NACK is sent on a dedicated (and/or specific) PUCCH (for the UE) and/or (ii) determine not to start unicast HARQ RTT Timer (e.g., C-RNTI HARQ RTT Timer) and/or unicast DRX Retransmission Timer (e.g., C-RNTI DRX Retransmission Timer) if NACK is sent on a common/shared PUCCH (for more than one UE). UE may determine whether to start unicast HARQ RTT Timer (e.g., C-RNTI HARQ RTT Timer) and/or unicast DRX Retransmission Timer (e.g., C-RNTI DRX Retransmission Timer) based on at least if PUCCH resource for sending NACK is common/shared/dedicated or not.

In some examples, UE may (i) determine to start unicast HARQ RTT Timer (e.g., C-RNTI HARQ RTT Timer) and/or unicast DRX Retransmission Timer (e.g., C-RNTI DRX Retransmission Timer) if CS-RNTI is configured/used to detect a retransmission for a multicast data/PDSCH/TB received on a pre-configured multicast resource and/or (ii) determine not to start unicast HARQ RTT Timer (e.g., C-RNTI HARQ RTT Timer) and/or unicast DRX Retransmission Timer (e.g., C-RNTI DRX Retransmission Timer) if CS-RNTI is not configured/used. UE may determine whether to start unicast HARQ RTT Timer (e.g., C-RNTI HARQ RTT Timer) and/or unicast DRX Retransmission Timer (e.g., C-RNTI DRX Retransmission Timer) based on whether CS-RNTI is configured (and/or used, such as for detecting a retransmission of a multicast data/PDSCH/TB received on a pre-configured multicast resource).

In some examples, one, some and/or all of the aforementioned instances of the term "multicast" may be replaced by the term "groupcast".

One, some and/or all of the foregoing examples, concepts, techniques and/or embodiments can be formed and/or combined to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

To enhance 3GPP specification, such as 3GPP TS 38.321 V17.1.0 (2022-06), for wireless communication in accordance with some embodiments herein, Enhancement 1 is provided herein. Enhancements 1 is reflective of implementation in accordance with some embodiments herein, and comprises modifications to 3GPP specification. According to some embodiments, at least a portion of Enhancement 1 may be implemented.

Enhancement 1 may be implemented according to one or more embodiments of the present disclosure. In Enhancement 1, addition 1, addition 2, addition 3, addition 4, addition 5 and/or addition 6 are made to Section 5.7 of 3GPP TS 38.321 V17.1.0 (2022-06). In some examples, embodiments of the present disclosure may be implemented via one or more of additions 1-6 in Enhancement 1. To distinguish addition X (where X=1, 2, 3, 4, 5, 6) from what is originally included in Section 5.7 of 3GPP TS 38.321 V17.1.0 (2022-06), addition Xis in bold, and is preceded by the term "ADDITION X STARTS:" and followed by the term "ADDITION X ENDS".

Enhancement 1:

5.7 Discontinuous Reception (DRX)

. . .

When DRX is configured, the MAC entity shall:

. . .

1> if a drx-HARQ-RTT-TimerDL expires:
2> if the data of the corresponding HARQ process was not successfully decoded:
ADDITION 1 STARTS:
3> if the data is not DL multicast transmission with HARQ feedback option=nack-only:
ADDITION 1 ENDS
4> start the drx-RetransmissionTimerDL for the corresponding HARQ process in the first symbol after the expiry of drx-HARQ-RTT-TimerDL.
ADDITION 2 STARTS:
3> if the data is unicast transmission or multicast transmission with HARQ feedback option=ack-nack:
ADDITION 2 ENDS
4> start the drx-RetransmissionTimerDL for the corresponding HARQ process in the first symbol after the expiry of drx-HARQ-RTT-TimerDL.
ADDITION 3 STARTS:
3> if HARQ feedback option is ack-nack:
ADDITION 3 ENDS
4> start the drx-RetransmissionTimerDL for the corresponding HARQ process in the first symbol after the expiry of drx-HARQ-RTT-TimerDL.

. . .

5.7b Discontinuous Reception (DRX) for MBS Multicast

[ ... ]
When multicast DRX is configured for a G-RNTI or G-CS-RNTI, the MAC entity shall for this G-RNTI or G-CS-RNTI:
  1> if a MAC PDU is received in a configured downlink multicast assignment:
    2> if HARQ feedback is enabled:
      3> start the drx-HARQ-RTT-TimerDL-PTM for the corresponding HARQ process in the first
         symbol after the end of the corresponding transmission carrying the DL HARQ feedback;
      ADDITION 4 STARTS:
        3> if HARQ feedback option is ack-nack;
      ADDITION 4 ENDS
        4> start the drx-HARQ-RTT-TimerDL for the corresponding HARQ process in the first
           symbol after the end of the corresponding transmission carrying the DL HARQ feedback.
      ADDITION 5 STARTS:
        3> if CS-RNTI is configured;
      ADDITION 5 ENDS
        4> start the drx-HARQ-RTT-TimerDL for the corresponding HARQ process in the first
           symbol after the end of the corresponding transmission carrying the DL HARQ feedback.
        3> start the drx-HARQ-RTT-TimerDL-PTM for the corresponding HARQ process in the first
           symbol after the end of the corresponding transmission carrying the DL HARQ feedback;
        3> start the drx-HARQ-RTT-TimerDL for the corresponding HARQ process in the first symbol
           after the end of the corresponding transmission carrying the DL HARQ feedback.
    2> stop the drx-RetransmissionTimerDL-PTM for the corresponding HARQ process;
    2> stop the drx-RetransmissionTimerDL for the corresponding HARQ process.
  1> if a drx-HARQ-RTT-TimerDL-PTM expires:
    2> if the data of the corresponding HARQ process was not successfully decoded:
      3> start the drx-RetransmissionTimerDL-PTM for the corresponding HARQ process in the first
         symbol after the expiry of drx-HARQ-RTT-TimerDL-PTM.
  1> if a DRX Command MAC CE with DCI scrambled with a G-RNTI is received:
    2> stop drx-onDurationTimerPTM of the DRX for this G-RNTI;
    2> stop drx-InactivityTimerPTM of the DRX for this G-RNTI.
  1> if [(SFN × 10) + subframe number] modulo (drx-LongCycle-PTM) = drx-StartOffset-PTM:
    2> start drx-onDurationTimerPTM after drx-SlotOffsetPTM from the beginning of the subframe.
  1> if the MAC entity is in Active Time for this G-RNTI or G-CS-RNTI:
    2> monitor the PDCCH for this G-RNTI or G-CS-RNTI as specified in TS 38.213 [6];
    2> if the PDCCH indicates a DL multicast transmission:
      3> if HARQ feedback is enabled:
        4> start the drx-HARQ-RTT-TimerDL-PTM for the corresponding HARQ process in the first
           symbol after the end of the corresponding transmission carrying the DL HARQ feedback;
      ADDITION 6 STARTS:
        4> if HARQ feedback option is ack-nack;
      ADDITION 6 ENDS
          5> start the drx-HARQ-RTT-TimerDL for the corresponding HARQ process in the first
             symbol after the end of the corresponding transmission carrying the DL HARQ feedback.
      3> stop the drx-RetransmissionTimerDL-PTM for the corresponding HARQ process;
      3> stop the drx-RetransmissionTimerDL for the corresponding HARQ process.
    2> if the PDCCH indicates a new multicast transmission for this G-RNTI or G-CS-RNTI:
      3> start or restart drx-InactivityTimerPTM in the first symbol after the end of the PDCCH
         reception.
  NOTE: A PDCCH indicating activation of multicast SPS is considered to indicate a new
        transmission.

The MAC entity needs not to monitor the PDCCH if it is not a complete PDCCH occasion (e.g. the Active Time starts or ends in the middle of a PDCCH occasion).

Figure 10:
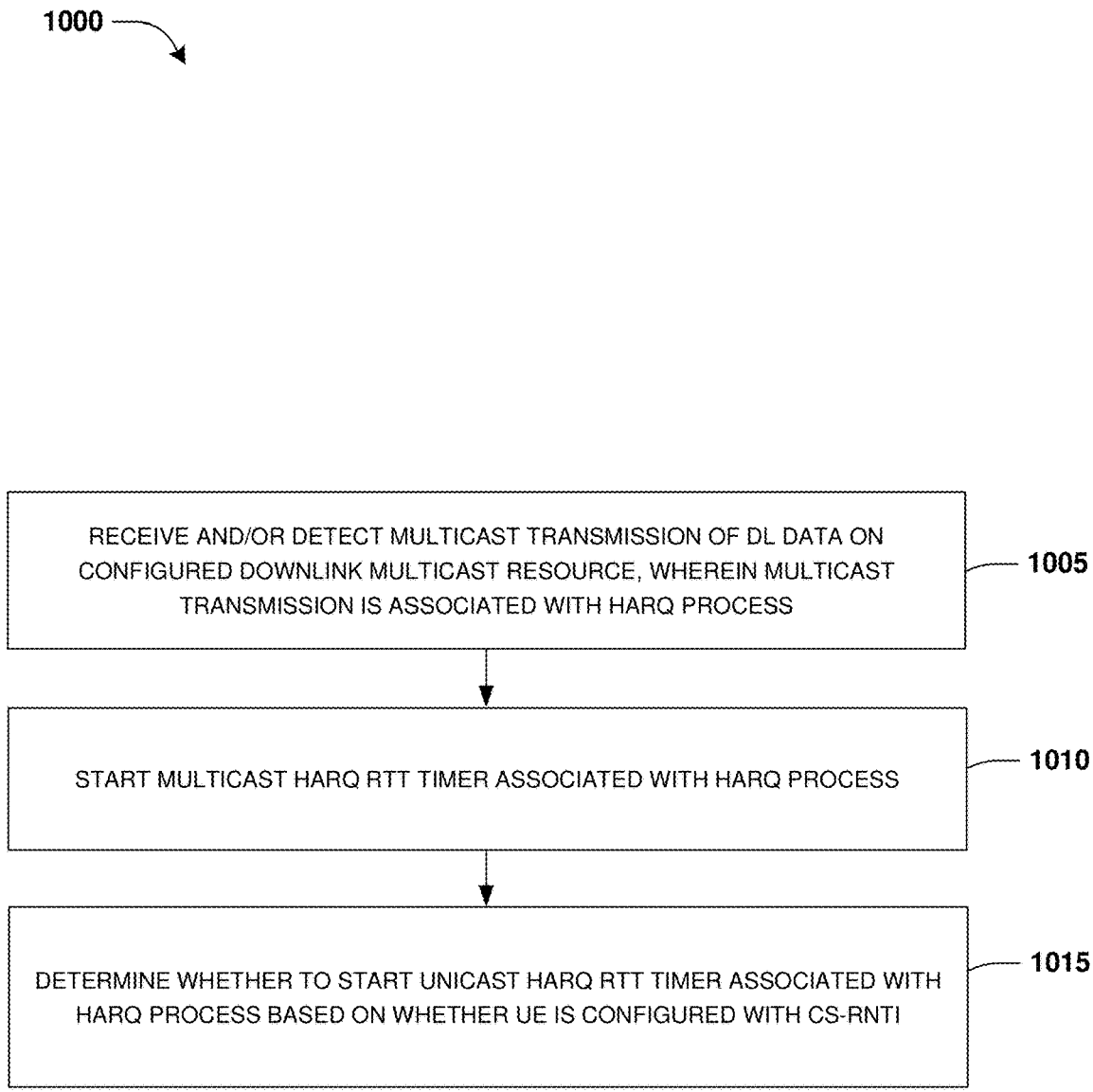
FIG. 10 is a flow chart according to one exemplary embodiment.

FIG. 10 is a flow chart 1000 according to one exemplary embodiment from the perspective of a UE. In step 1005, the UE receives and/or detects a multicast transmission of downlink data on a configured downlink multicast resource, wherein the multicast transmission is associated with a HARQ process. In some examples, the multicast transmission (and/or the downlink data) is for the HARQ process. In some examples, the multicast transmission of the downlink data may be received and/or detected for (and/or in association with) the HARQ process. In some examples, the configured downlink multicast resource is a pre-configured downlink multicast resource (e.g., a downlink multicast resource with which the UE is configured prior to receiving and/or detecting the multicast transmission). In some examples, the configured downlink multicast resource may comprise a downlink multicast assignment. In step 1010, the UE starts a multicast HARQ RTT timer associated with the HARQ process. In some examples, the UE starts the multicast HARQ RTT timer in response to transmitting a negative HARQ feedback (e.g., NACK) for the multicast transmission (e.g., the UE may transmit the negative HARQ feedback in response to failing to decode the multicast transmission and/or the downlink data). In step 1015, the UE determines whether to start a unicast HARQ RTT timer associated with the HARQ process based on whether the UE is configured with a CS-RNTI. In some examples, the determination (in step 1015) of whether to start the unicast HARQ RTT timer is performed based upon other information in addition to whether the UE is configured with the CS-RNTI. In some examples, the CS-RNTI is used for detecting a transmission (e.g., a retransmission) of the downlink data associated with the HARQ process.

In some examples, the multicast transmission is transmitted by a network (e.g., a gNB).

In some examples, the multicast transmission comprises a new multicast transmission of the downlink data. In some examples, the new multicast transmission of the downlink data is not a retransmission of a prior multicast transmission by the network. In some examples, the new multicast transmission of the downlink data is not a retransmission of the downlink data (e.g., the new multicast transmission corresponds to an initial transmission of the downlink data by the network).

In one embodiment, the UE starts the unicast HARQ RTT timer based on the UE being configured with the CS-RNTI. For example, the UE may determine to start the unicast HARQ RTT timer if the UE is configured with the CS-RNTI (to be used for detecting a retransmission of the downlink data associated with the HARQ process, for example). Alternatively and/or additionally, the UE may determine to start the unicast HARQ RTT timer if the UE is configured to use the CS-RNTI for the HARQ process (e.g., the UE is configured to use the CS-RNTI for detecting a retransmission of the downlink data associated with the HARQ process). In some examples, the UE starts the unicast HARQ RTT timer concurrently with starting the multicast HARQ RTT timer. In some examples, a difference between a time at which the UE starts the unicast HARQ RTT timer and a time at which the UE starts the multicast HARQ RTT timer is at most a threshold difference.

In one embodiment, the UE does not start the unicast HARQ RTT timer based on the UE not being configured with the CS-RNTI. For example, the UE may determine not to start the unicast HARQ RTT timer if the UE is not configured with the CS-RNTI (to be used for detecting a retransmission of the downlink data associated with the HARQ process, for example) and/or if the UE is not configured to use the CS-RNTI for the HARQ process (e.g., the UE is not configured to use the CS-RNTI for detecting a retransmission of the downlink data associated with the HARQ process).

In one embodiment, the multicast HARQ RTT Timer is a drx-HARQ-RTT-TimerDL-PTM timer. In some examples, the drx-HARQ-RTT-TimerDL-PTM timer is associated with point-to-multipoint (PTM) communication.

In one embodiment, the unicast HARQ RTT timer is a drx-HARQ-RTT-TimerDL timer.

In one embodiment, the UE starts a unicast DRX retransmission timer associated with the HARQ process in response to (e.g., upon) expiry of the unicast HARQ RTT timer.

In one embodiment, the UE starts a multicast DRX retransmission timer associated with the HARQ process in response to (e.g., upon) expiry of the multicast HARQ RTT timer.

In one embodiment, the UE monitors PDCCH when the unicast DRX retransmission timer is running. For example, the UE is configured to perform PDCCH monitoring (e.g., monitoring for a unicast transmission on PDCCH) when the unicast DRX retransmission timer is running. For example, the UE monitors PDCCH for a unicast transmission (e.g., a unicast retransmission of the downlink data) when the unicast DRX retransmission timer is running.

In one embodiment, the UE monitors PDCCH when the multicast DRX retransmission timer is running. For example, the UE is configured to perform PDCCH monitoring (e.g., monitoring for a multicast transmission on PDCCH) when the multicast DRX retransmission timer is running. For example, the UE monitors PDCCH for a multicast transmission (e.g., a multicast retransmission of the downlink data) when the multicast DRX retransmission timer is running.

Referring back to FIGS. 3 and 4, in one exemplary embodiment of a UE, the device 300 includes a program code 312 stored in the memory 310. The CPU 308 could execute program code 312 to enable the UE (i) to receive and/or detect a multicast transmission of downlink data on a configured downlink multicast resource, wherein the multicast transmission is associated with a HARQ process, (ii) to start a multicast HARQ RTT timer associated with the HARQ process, and (iii) to determine whether to start a unicast HARQ RTT timer associated with the HARQ process based on whether the UE is configured with a CS-RNTI. Furthermore, the CPU 308 can execute the program code 312 to perform one, some and/or all of the above-described actions and steps and/or others described herein.

Figure 11:
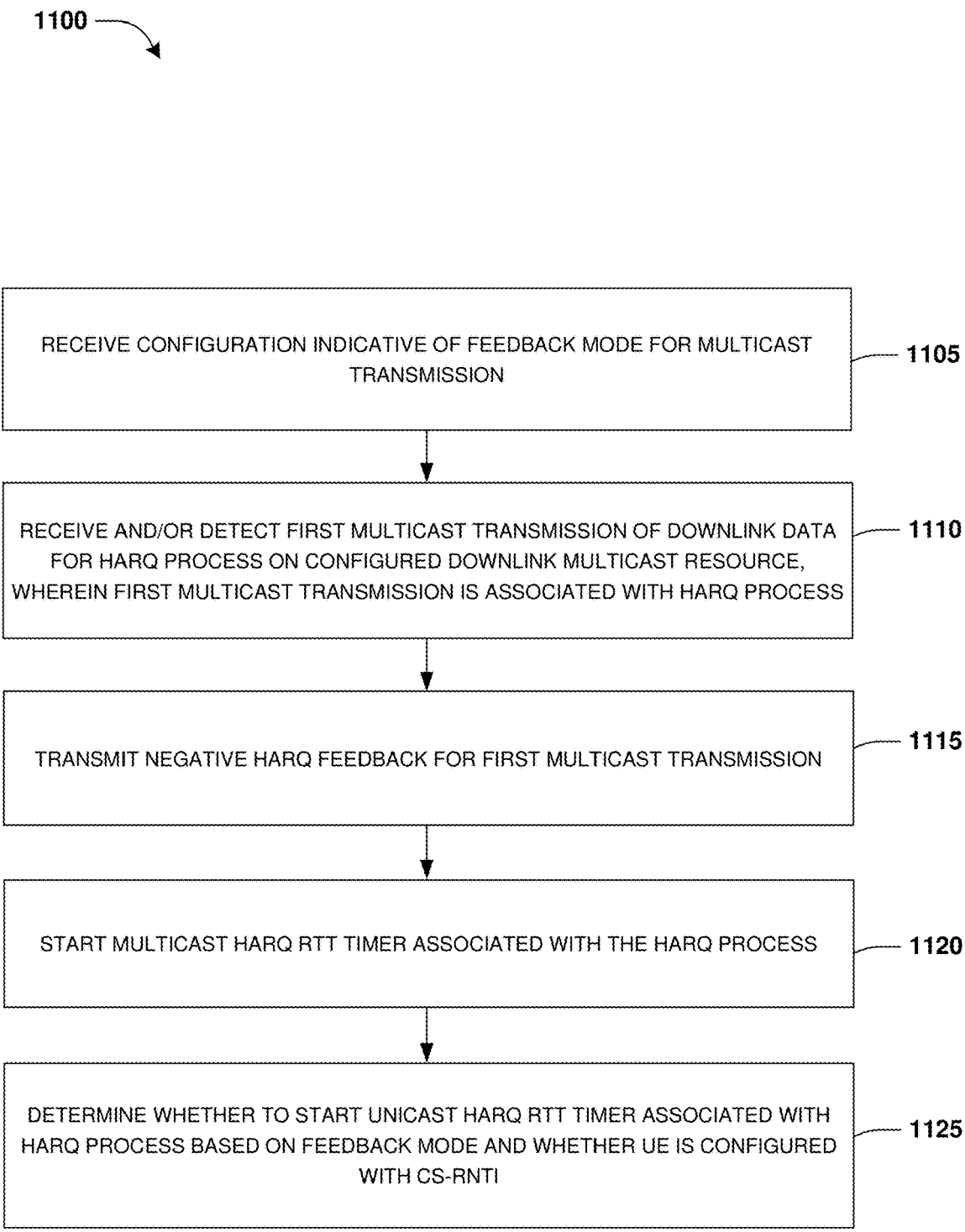
FIG. 11 is a flow chart according to one exemplary embodiment.

FIG. 11 is a flow chart 1100 according to one exemplary embodiment from the perspective of a UE. In step 1105, the UE receives a configuration indicative of a feedback mode (e.g., HARQ feedback mode) for multicast transmission. In some examples, the configuration is indicative of the feedback mode to be used by the UE for receiving one or more multicast transmissions. In step 1110, the UE receives and/or detects a first multicast transmission of downlink data on a configured downlink multicast resource, wherein the first multicast transmission is associated with a HARQ process. In some examples, the first multicast transmission (and/or the downlink data) is for the HARQ process. In some examples, the first multicast transmission of the downlink data may be received and/or detected for (and/or in association with) the HARQ process. In some examples, the configured downlink multicast resource is a pre-configured downlink multicast resource (e.g., a downlink multicast resource with which the UE is configured prior to receiving and/or detecting the first multicast transmission). In some examples, the configured downlink multicast resource may comprise a downlink multicast assignment. In step 1115, the UE transmits a negative HARQ feedback (e.g., NACK) for the first multicast transmission. In some examples, the UE transmits the negative HARQ feedback in response to failing to decode the first multicast transmission and/or the downlink data. In some examples, the UE transmits the negative HARQ feedback to a sender of the first multicast transmission. In step 1120, the UE starts a multicast HARQ RTT timer associated with the HARQ process. In some examples, the UE starts the multicast HARQ RTT timer in response to transmitting the negative HARQ feedback for the first multicast transmission. In step 1125, the UE determines whether to start a unicast HARQ RTT timer associated with the HARQ process based on the feedback mode and whether the UE is configured with a CS-RNTI. In some examples, the determination (in step 1125) of whether to start the unicast HARQ RTT timer is performed based upon other information in addition to the feedback mode and whether the UE is configured with the CS-RNTI. In some examples, the CS-RNTI is used for detecting a transmission (e.g., a retransmission) of the downlink data associated with the HARQ process.

In some examples, the first multicast transmission is transmitted by a network (e.g., a gNB). In some examples, the UE transmits the negative HARQ feedback to the network.

In some examples, the first multicast transmission comprises a new multicast transmission of the downlink data. In some examples, the new multicast transmission of the downlink data is not a retransmission of a prior multicast transmission by the network. In some examples, the new multicast transmission of the downlink data is not a retransmission of the downlink data (e.g., the new multicast transmission corresponds to an initial transmission of the downlink data by the network).

In some examples, the feedback mode that is used by the UE (in step 1125) to determine whether to start the unicast HARQ RTT timer may be different than the feedback mode indicated by the configuration received by the UE.

In some examples, the configuration comprises a first indication that the feedback mode is a first feedback mode (e.g., ack-nack mode or nack-only mode). In some examples, after receiving the configuration, the feedback mode may be switched (by the UE, the network and/or another entity, for example) from the first feedback mode to a second feedback mode (e.g., the feedback mode may be switched from ack-nack mode to nack-only mode or from nack-only mode to ack-nack mode). After switching the feedback mode from the first feedback mode to the second feedback mode, the feedback mode used by the UE for multicast transmission may be different than the first indication of the feedback mode. In some examples, the feedback mode that is used by the UE (in step 1125) to determine whether to start the unicast HARQ RTT timer is the second feedback mode, which may be different than the first feedback mode indicated by the configuration received by the UE.

In some examples, the feedback mode that is used by the UE (in step 1125) to determine whether to start the unicast HARQ RTT timer may be the same as the feedback mode indicated by the configuration received by the UE.

In one embodiment, the UE starts the unicast HARQ RTT timer based on the UE being configured with the CS-RNTI and the feedback mode being ack-nack mode. For example, the UE may determine to start the unicast HARQ RTT timer if (i) the UE is configured with the CS-RNTI (to be used for detecting a retransmission of the downlink data associated with the HARQ process, for example) and/or the UE is configured to use the CS-RNTI for the HARQ process (e.g., the UE is configured to use the CS-RNTI for detecting a retransmission of the downlink data associated with the HARQ process), and (ii) the feedback mode is ack-nack mode. In some examples, the UE starts the unicast HARQ RTT timer concurrently with starting the multicast HARQ RTT timer. In some examples, a difference between a time at which the UE starts the unicast HARQ RTT timer and a time at which the UE starts the multicast HARQ RTT timer is at most a threshold difference.

In one embodiment, the UE does not start the unicast HARQ RTT timer based on at least one of (i) the UE not being configured with the CS-RNTI or (ii) the feedback mode being nack-only mode. For example, the UE may determine not to start the unicast HARQ RTT timer if at least one of (i) the UE is not configured with the CS-RNTI (to be used for detecting a retransmission of the downlink data associated with the HARQ process, for example) and/or the UE is not configured to use the CS-RNTI for the HARQ process (e.g., the UE is not configured to use the CS-RNTI for detecting a retransmission of the downlink data associated with the HARQ process), or (ii) the feedback mode is nack-only mode.

In one embodiment, the configuration is a harq-FeedbackOptionMulticast configuration.

In some examples, the configuration is indicative of the feedback mode to be used by the UE for receiving one or more multicast transmissions (comprising the first multicast transmission, for example) from the network and/or one or more other networks.

In one embodiment, the multicast HARQ RTT Timer is a drx-HARQ-RTT-TimerDL-PTM timer.

In one embodiment, the unicast HARQ RTT timer is a drx-HARQ-RTT-TimerDL timer.

In one embodiment, the UE starts a unicast DRX retransmission timer associated with the HARQ process in response to (e.g., upon) expiry of the unicast HARQ RTT timer.

In one embodiment, the UE starts a multicast DRX retransmission timer associated with the HARQ process in response to (e.g., upon) expiry of the multicast HARQ RTT timer.

In one embodiment, the UE monitors PDCCH when the unicast DRX retransmission timer is running. For example, the UE is configured to perform PDCCH monitoring (e.g., monitoring for a unicast transmission on PDCCH) when the unicast DRX retransmission timer is running. For example, the UE monitors PDCCH for a unicast transmission (e.g., a unicast retransmission of the downlink data) when the unicast DRX retransmission timer is running.

In one embodiment, the UE monitors PDCCH when the multicast DRX retransmission timer is running. For example, the UE is configured to perform PDCCH monitoring (e.g., monitoring for a multicast transmission on PDCCH) when the multicast DRX retransmission timer is running. For example, the UE monitors PDCCH for a multicast transmission (e.g., a multicast retransmission of the downlink data) when the multicast DRX retransmission timer is running.

Referring back to FIGS. 3 and 4, in one exemplary embodiment of a UE, the device 300 includes a program code 312 stored in the memory 310. The CPU 308 could execute program code 312 to enable the UE (i) to receive a configuration indicative of a feedback mode for multicast transmission, (ii) to receive and/or detect a first multicast transmission of downlink data on a configured downlink multicast resource, wherein the first multicast transmission is associated with a HARQ process, (iii) to transmit a negative HARQ feedback for the first multicast transmission, (iv) to start a multicast HARQ RTT timer associated with the HARQ process, and (v) to determine whether to start a unicast HARQ RTT timer associated with the HARQ process based on the feedback mode and whether the UE is configured with a CS-RNTI. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 10-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-11, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network). In some systems, if a network (e.g., gNB) would not schedule unicast retransmissions for a multicast data, but the UE may still try to receive unicast retransmissions since UE is still monitoring C-RNTI on PDCCH (e.g., monitoring for C-RNTI retransmission of the multicast data) due to a running unicast DRX retransmission timer. Using the embodiments provided herein, UE can save more power by reducing active time for C-RNTI monitoring on PDCCH.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
being configured with a Group Configured Scheduling RNTI (G-CS-RNTI) by a base station, wherein the G-CS-RNTI is used for Semi-Persistent Scheduling (SPS) activation associated with a multicast configured downlink resource;
at least one of receiving or detecting a multicast transmission of downlink data on the multicast configured downlink resource after SPS activation, wherein the multicast transmission is associated with a Hybrid Automatic Repeat Request (HARQ) process;
starting a multicast HARQ Round Trip Time (RTT) timer associated with the HARQ process; and
determining whether to start a unicast HARQ RTT timer associated with the HARQ process based on whether the UE is configured with a Configured Scheduling Radio Network Temporary Identifier (CS-RNTI).

2. The method of claim 1, comprising:
starting the unicast HARQ RTT timer based on the UE being configured with the CS-RNTI.

3. The method of claim 2, comprising:
starting a unicast Discontinuous Reception (DRX) retransmission timer associated with the HARQ process in response to expiry of the unicast HARQ RTT timer.

4. The method of claim 3, comprising:
monitoring Physical Downlink Control Channel (PDCCH) when the unicast DRX retransmission timer is running.

5. The method of claim 2, comprising:
starting a multicast Discontinuous Reception (DRX) retransmission timer associated with the HARQ process in response to expiry of the multicast HARQ RTT timer.

6. The method of claim 5, comprising:
monitoring Physical Downlink Control Channel (PDCCH) when the multicast DRX retransmission timer is running.

7. The method of claim 1, comprising:
not starting the unicast HARQ RTT timer based on the UE not being configured with the CS-RNTI.

8. The method of claim 1, wherein:
the multicast HARQ RTT Timer is a drx-HARQ-RTT-TimerDL-PTM timer.

9. The method of claim 1, wherein:
the unicast HARQ RTT timer is a drx-HARQ-RTT-TimerDL timer.

10. A method of a User Equipment (UE), comprising:
receiving a configuration indicative of a feedback mode for multicast transmission;
being configured with a Group Configured Scheduling RNTI (G-CS-RNTI) by a base station, wherein the G-CS-RNTI is used for Semi-Persistent Scheduling (SPS) activation associated with a multicast configured downlink resource;
at least one of receiving or detecting a first multicast transmission of downlink data on the multicast configured downlink resource after SPS activation, wherein the first multicast transmission is associated with a Hybrid Automatic Repeat Request (HARQ) process;
transmitting a negative HARQ feedback for the first multicast transmission;
starting a multicast HARQ Round Trip Time (RTT) timer associated with the HARQ process; and
determining whether to start a unicast HARQ RTT timer associated with the HARQ process based on the feedback mode and whether the UE is configured with a Configured Scheduling Radio Network Temporary Identifier (CS-RNTI).

11. The method of claim 10, comprising:
starting the unicast HARQ RTT timer based on:
the UE being configured with the CS-RNTI; and
the feedback mode being ack-nack mode.

12. The method of claim 11, comprising:
starting a unicast Discontinuous Reception (DRX) retransmission timer associated with the HARQ process in response to expiry of the unicast HARQ RTT timer.

13. The method of claim 11, comprising:
starting a multicast Discontinuous Reception (DRX) retransmission timer associated with the HARQ process in response to expiry of the multicast HARQ RTT timer.

14. The method of claim 10, comprising:
not starting the unicast HARQ RTT timer based on at least one of:
the UE not being configured with the CS-RNTI; or
the feedback mode being nack-only mode.

15. The method of claim 10, wherein:
the configuration is a harq-FeedbackOptionMulticast configuration.

16. The method of claim 10, wherein:
the multicast HARQ RTT Timer is a drx-HARQ-RTT-TimerDL-PTM timer.

17. The method of claim 10, wherein:
the unicast HARQ RTT timer is a drx-HARQ-RTT-TimerDL timer.

18. A User Equipment (UE) comprising:

a control circuit;

a processor installed in the control circuit; and a memory installed in the control circuit and operatively coupled to the processor, wherein the processor is configured to execute a program code stored in the memory to perform operations, the operations comprising:

being configured with a Group Configured Scheduling RNTI (G-CS-RNTI) by a base station, wherein the G-CS-RNTI is used for Semi-Persistent Scheduling (SPS) activation associated with a multicast configured downlink resource;

at least one of receiving or detecting a multicast transmission of downlink data on the multicast configured downlink resource after SPS activation, wherein the multicast transmission is associated with a Hybrid Automatic Repeat Request (HARQ) process;

starting a multicast HARQ Round Trip Time (RTT) timer associated with the HARQ process; and determining whether to start a unicast HARQ RTT timer associated with the HARQ process based on whether the UE is configured with a Configured Scheduling Radio Network Temporary Identifier (CS-RNTI).

19. The UE of claim 18, the operations comprising:

starting the unicast HARQ RTT timer based on the UE being configured with the CS-RNTI.

20. The UE of claim 18, the operations comprising:

not starting the unicast HARQ RTT timer based on the UE not being configured with the CS-RNTI.

* * * * *